US007885680B2

(12) United States Patent
Larsson

(10) Patent No.: US 7,885,680 B2
(45) Date of Patent: Feb. 8, 2011

(54) INSTANTANEOUS JOINT TRANSMIT POWER CONTROL AND LINK ADAPTATION FOR RTS/CTS BASED CHANNEL ACCESS

(75) Inventor: Peter Larsson, Solna (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 625 days.

(21) Appl. No.: 11/947,306

(22) Filed: Nov. 29, 2007

(65) Prior Publication Data
US 2008/0076465 A1    Mar. 27, 2008

Related U.S. Application Data

(62) Division of application No. 10/117,128, filed on Apr. 8, 2002, now abandoned.

(60) Provisional application No. 60/282,191, filed on Apr. 9, 2001.

(51) Int. Cl.
H04B 7/00      (2006.01)
H04Q 7/20     (2006.01)

(52) U.S. Cl. .................. 455/522; 455/69; 455/63.1; 455/67.13

(58) Field of Classification Search ............ 455/522, 455/69, 63.1, 67.13, 517, 524, 67.11, 226.1, 455/226.2; 370/328, 318, 349
See application file for complete search history.

(56) References Cited

U.S. PATENT DOCUMENTS

| 5,732,077 | A  |   | 3/1998  | Whitehead |         |
|-----------|----|---|---------|-----------|---------|
| 5,956,649 | A  | * | 9/1999  | Mitra et al. | 455/522 |
| 5,982,765 | A  |   | 11/1999 | Shimada |         |
| 6,859,463 | B1 | * | 2/2005  | Mayor et al. | 370/445 |
| 2005/0239489 | A1 | * | 10/2005 | Qian et al. | 455/522 |

FOREIGN PATENT DOCUMENTS

| EP | 1001572 A1 | 5/2000 |
| EP | 1050977 A2 | 11/2000 |
| WO | WO 95 01020 A1 | 1/1995 |
| WO | WO 99 26364 A1 | 5/1999 |

(Continued)

OTHER PUBLICATIONS

Champness, Angela, "Understanding the Benefits of IEEE 802.11", published 1997, pp. 1-9.

(Continued)

Primary Examiner—John Lee
(74) Attorney, Agent, or Firm—Roger S. Burleigh

(57) ABSTRACT

A method for closed loop link adjustment based on a Request To Send-Clear To Send (RTS-CTS) channel access scheme includes the following steps. Designating a station as an originating station. Transmitting a RTS frame with predetermined transmit power from an originating station, prior to an intended DATA transmission, sounding the channel such that reception characteristics can be evaluated at a designated receiving station. Transmitting, in response to the originating station, a CTS frame with a predetermined transmit power from the receiving station with directives of link adjustments. Transmitting a DATA frame from the originating station to the receiving station frame complying with link adjustment directives to the extent of the originating stations capabilities. And, transmitting an acknowledge (ACK) frame in response to the originating stations from the receiving station indicating result of DATA frame reception.

18 Claims, 20 Drawing Sheets

FOREIGN PATENT DOCUMENTS

| | | |
|---|---|---|
| WO | WO 99 34531 | 7/1999 |
| WO | WO 00 38351 A2 | 6/2000 |
| WO | WO 00 76083 A1 | 12/2000 |

OTHER PUBLICATIONS

Chow F M et al: "Effect of Non-reciprocity on Infrared Wireless Local-area Networks" IEEE GLOBECOM 1999, XP010373322 * abstract * p. 331, right-hand column, paragraph 2—p. 332, left-hand column, paragraph 3.

Gholmieh, Ralph A. "Distributed Coordination Function"; Oct. 5, 1998, p. 1.

Gholmieh, Ralph A., "Point Coordination Function"; Oct. 5, 1998 p. 1.

Karn, Phil; "MACA—A New Channel Access Method for Packet Radio", Proc $9^{th}$ ARRl/CRRL Amateur Radio Computer Networking Conference, Sep. 1990, pp. 134-140.

Karve, Anita, "802.11 and Spread Spectrum" Network Magazine, Dec. 1, 1997, pp. 1-4.

Lal S et al: "Distributed Resource Allocation for DS-CDMA-Based Multimedia Ad Hoc Wireless Lan's" IEEE Journal on Selected Areas in Communications, IEEE Inc. New York, US, vol. 17, No. 5, May 1999, pp. 947-967, XP000830247 ISSN: 0733-8716 p. 954, left-hand column, paragraph 3—right-hand column, paragraph 3 p. 957, left-hand column, paragraph 2.

Russell, Richard G. "VG-Any LAN" published Jan. 1997, pp. 1-2.

\* cited by examiner

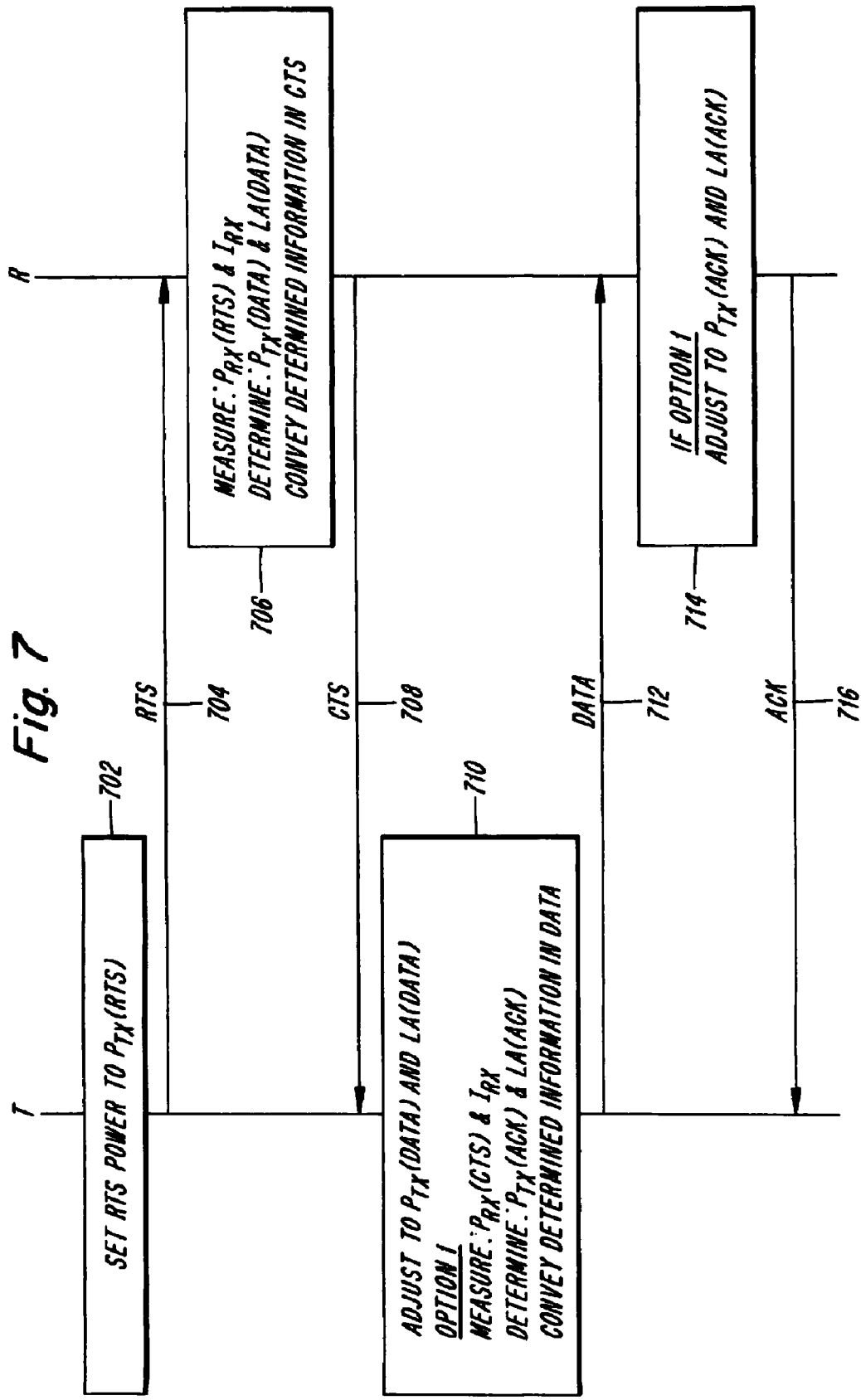

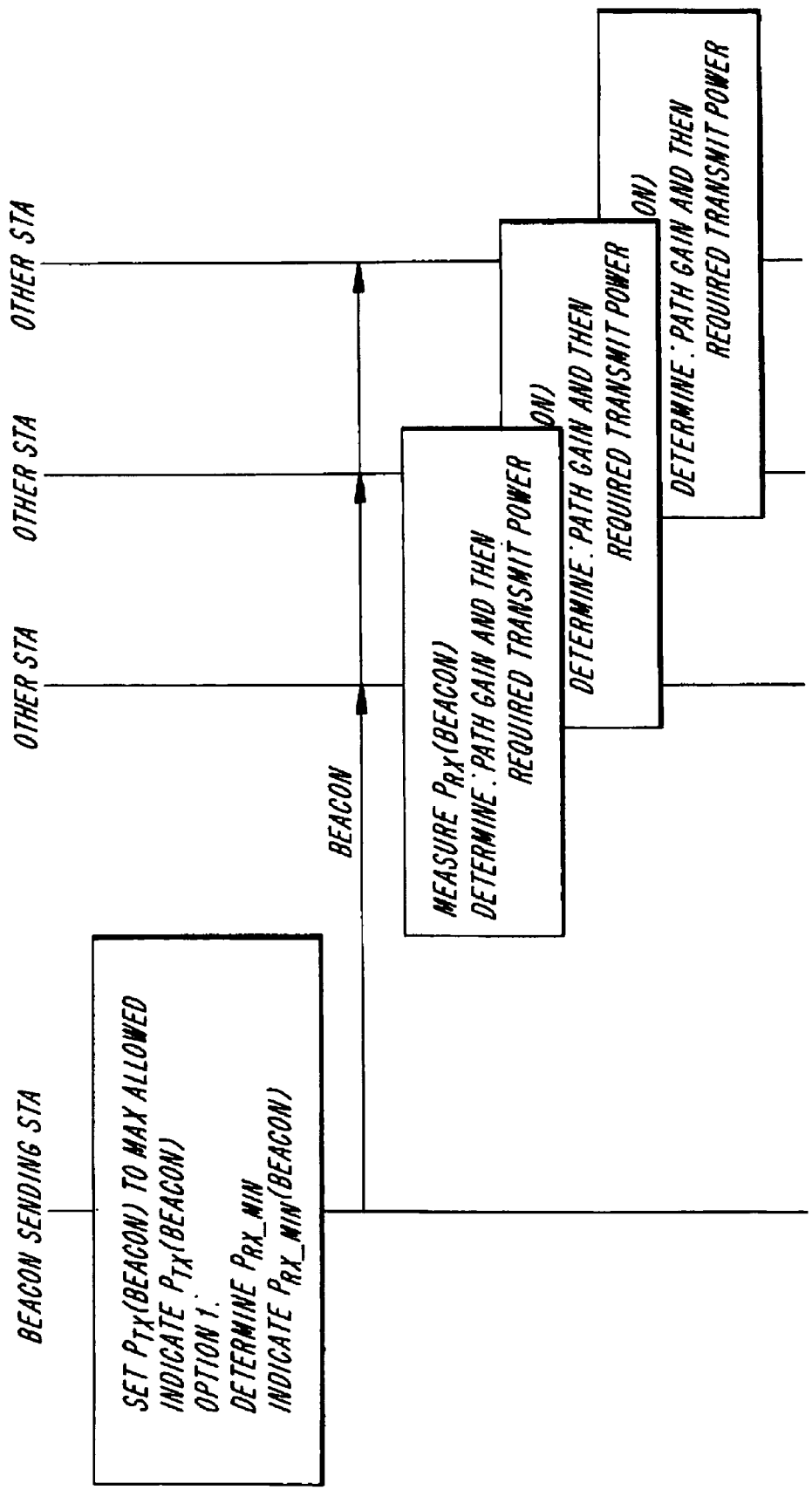

Fig. 18

| TIER | TOPOLOGICAL DESTINATION OBJECTIVES | FRAME SUBTYPES | TPC POLICY |
|---|---|---|---|
| 1 | OUTSIDE AND WITHIN (I)BSS | BEACON, PROBE REQUEST[1], PROBE REQUEST[2,3] | $P_{TX} \leq$ HIGHEST PERMITTED DOMAIN TRANSMIT POWER<br>DEFINITION RANGE $\rightarrow$ START OF THE BEACON<br>DEFINITION RANGE $\leq$ IMMEDIATE VICINITY AFTER THE BEACON |
| 2 | WITHIN (I)BSS | RTS, CTS,[3] | $P_{TX} \leq MIN(P_{TX\_max}, MAX\ REQUIRED\ P_{TX}\ TO\ ANY\ STA\ IN\ (I)BSS)$<br>$P_{TX} \leq$ TIER 1<br>OUTSIDE TIER 1 DEFINITION RANGE |
| 3 | DIRECTED TO SINGLE STA | DATA, ACK,[3] | $P_{TX} \leq$ REQUIRED $P_{TX}$ TO DESIRED USER<br>$P_{TX} \leq$ TIER 2<br>OUTSIDE TIER 1 DEFINITION RANGE |

Fig. 19

| OCTETS: 1 | OCTETS: 1 | OCTETS: 0 |
|---|---|---|
| ELEMENT ID | LENGTH | TRANSMIT POWER INFORMATION REQUEST |

Fig. 20

| OCTETS: 1 | OCTETS: 1 | OCTETS: 1 |
|---|---|---|
| ELEMENT ID | LENGTH | TRANSMIT POWER INFORMATION, $P_{TX}$ |

Fig. 21

| OCTETS: 1 | OCTETS: 1 | OCTETS: 1 |
|---|---|---|
| ELEMENT ID | LENGTH | MINIMUM REQUIRED RECEIVE POWER, $P_{RX\_min}$ |

MANAGEMENT FRAME SUBTYPE BEACON IS MODIFIED TO INCLUDE 3 NEW IEs.

| ORDER | INFORMATION | COMMENTS |
|---|---|---|
| 11 | DOMAIN INFORMATION | |
| 12 | TRANSMIT POWER INFORMATION REQUEST ELEMENT | ONLY IN BSS OPERATION |
| 13 | TRANSMIT POWER INFORMATION ELEMENT | ONLY IN IBSS OPERATION |

Fig. 22

| ORDER | INFORMATION | COMMENTS |
|---|---|---|
| 3 | TRANSMIT POWER INFORMATION REQUEST ELEMENT | ONLY IN BSS OPERATION |

Fig. 23

| ORDER | INFORMATION | COMMENTS |
|---|---|---|
| 10 | TRANSMIT POWER INFORMATION ELEMENT | ONLY IN BSS OPERATION |

Fig. 24

| B0-B1 | B2-B7 |
|---|---|
| RESERVED | CL-TPC INFO : 1 dB STEPS |

US 7,885,680 B2

INSTANTANEOUS JOINT TRANSMIT POWER CONTROL AND LINK ADAPTATION FOR RTS/CTS BASED CHANNEL ACCESS

CROSS-REFERENCE TO RELATED APPLICATIONS

This application is a divisional of U.S. application Ser. No. 10/117,128, filed Apr. 8, 2002, now abandoned, which claims the benefit of U.S. Provisional Application No. 60/282,191, filed on Apr. 9, 2001, the disclosure of which is incorporated herein by reference.

BACKGROUND OF THE INVENTION

1. Field of the Invention

The invention relates to the field of wireless communications, in particular to transmit power control and link adaptation techniques and mechanisms.

2. Background Information

The IEEE 802.11 is a wireless LAN (Local Area Network) standard that has been standardized by IEEE (Institute of Electrical & Electronics Engineers). The IEEE 802.11 wireless LAN standard is currently undergoing a process of extending the standard with QoS (Quality of Service) features. The objective is to enable, for example, computers or multimedia devices to communicate under QoS constraints. This standard extension goes under the name IEEE 802.11e and is managed by the so-called task group e, TGe.

Recently, the IEEE 802.11 standard was also extended with a new physical layer allowing higher data rates than the previous physical layer. Various data rates are enabled through several code rates and signal constellations. The purpose is to allow link adaptation depending on the channel quality. The high rate PHY (physical layer) on the so-called 5 GHz band is called IEEE 802.11a and is based on OFDM (Orthogonal Frequency Division Multiplexing). The corresponding so-called 2.4 GHz band PHY is called IEEE 802.11b and uses single carrier modulation schemes.

IEEE 802.11 operates either in a DCF (Distributed Coordination Function) or a PCF (Point Coordination Function) mode. The former is for distributed operation and the latter for centralized control from an access point, AP. So far the PCF mode has not been ratified by implementers as the complexity is consider to high, instead DCF is used both for the distributed operation as well as with the AP.

The origin of IEEE 802.11 access scheme is traced back to BTMA (Busy Tone Multiple Access) which was the first proposed method for distributed control of channel access avoiding the well known hidden terminal problem.

In MACA (Multiple Access with Collision Avoidance), proposed by Phil Karn in 1980, the introduction of a Request To Send (RTS) and Clear To Send (CTS), handshake phase prior data transmission solved the idea of distributed reservation. This presented a more feasible basis to build a practical system upon as it did not divide the frequency band in a channel for data and busy tones, as in the BTMA scheme. Also the idea of random exponential back off, that was later used in IEEE 802.11, was introduced in MACA.

In MACAW (Multiple Access with Collision Avoidance for Wireless), the basic mechanism of MACA was refined. Among other things, a link acknowledgment, ACK, scheme was introduced. The access scheme of IEEE 802.11 is now based to a great extent on principles developed in MACAW.

Other ongoing standardization activities in IEEE 802.11 include the so-called TGh (Task Group h, i.e., an IEEE task group for IEEE 802.11h) that has the objective of designing and including transmit power control (TPC), as well as distributed frequency selection (DFS), in IEEE 802.11a. The purpose of power control from a standardization point of view is primarily to enable IEEE 802.11a stations, STAs, to conform to European regulatory requirements.

As background information, the basic access principles for IEEE 802.11 will now be described. For more detailed information the reader is referred to the standard IEEE 802.11-1999 (which replaces IEEE 802.11-1997), the standard IEEE 802.11a-1999 (High data rate on the 5 GHz Band), and the standard IEEE 802.11b-1999 (High data rate on the 2.4 GHz Band). Good and simple overviews may also be found in a) "Smart Antenna Systems and Wireless LANs", authored by Garret T. Okamoto and published by Kluwer academic publishers (ISBN 0-7923-8335-4), and "IEEE 802.11 Handbook, A Designers Companion", authored by Bob O'Hara and Al Patrick (ISBN 0-7381-1855-9).

There are two modes of channel access scheme operation in the Distributed Co-ordination Function (DCF), one based on CSMA/CA (Carrier Sense Multiple Access/Collision Avoidance) and one based on CSMA/CA including RTS-CTS message exchange. A MIB (Management Information Base) attribute "dot11RTSThreshold" is used to differentiate the use of the two. MPDUs (MAC Protocol Data Units, where "MAC" stands for Medium Access Control) shorter than the threshold is sent without RTS-CTSs, whereas longer MPDUs are sent with RTS-CTSs. The focus here is the RTS-CTS based CSMA/CA mechanism that enables mitigation of hidden stations and hence in general provides a more efficient use of the wireless medium.

FIGS. 1A-1D show a communication procedure between a station T and a station R, and related effects on nearby stations E, F, G, H. In FIG. 1A, station T transmits an RTS (Request to Send) signal to the station R. The transmit range 102 of the station T encompasses the stations R, E and F, but not the stations H, G. Thus the stations R, E and F receive or overhear the RTS signal, but the stations H, G do not. In a next step shown in FIG. 1B, in reply to the RTS signal, the station R sends a CTS (Cleared to Send) reply signal to the station T. As shown in FIG. 1B, the transmit range 104 of the station R encompasses the station F, H but not the stations E, G. After receiving the CTS signal, in FIG. 1C the station T transmits a DATA signal to the station R, and then in FIG. 1D the station R acknowledges receipt of the DATA signal by sending an ACK signal or message to the station T.

Since the station H is a hidden station with respect to the station T, it is informed of the intention of station T to transmit via the reply CTS message sent by the station R (since station H is not hidden from the station R, i.e., it is within the transmit range 104 of the station R). As a consequence, the station H will not transmit and disturb ongoing reception by the station R. Stations E and F will in a similar manner defer channel access to the stations T and R, after overhearing the RTS from the station T and/or the CTS from the station R. As shown in FIGS. 1A-1D, station G is hidden from both stations T and R, and therefore will likely not overhear the RTS or CTS, and therefore it may transmit.

FIG. 2 illustrates frame formats used in IEEE 802.11, where the numbers above the boxes indicate the size of the information in the box. Note, Address 4 in the DATA and MANAGEMENT frame exists only for DATA frames in a wireless DS (Distribution System), and does not exist in MANAGEMENT frames.

FIG. 3 illustrates the frame exchange including RTS and CTS. When frames are received by stations other than those intended to receive the frames, a so called NAV (Network Allocation Vector) is set according to a duration value indicated in a field of the frame. This provides an additional collision avoidance mechanism to the physical channel access sensing and is therefore called virtual channel sensing. As long as either the physical or virtual channel sense indicates activities on the channel, a station must remain silent. When the channel becomes free, stations start contending for the channel according to the channel access principles defined in the IEEE 802.11-1999 standard. In general, the NAV can only be extended if new frames are received. There exist some special instances when the NAV can be reset as well, but that is not the normal operation.

FIG. 4 illustrates use of RTS-CTS with DATA fragmentation. Each fragment and ACK then acts as implicit RTS and CTS. Additional fragments are indicated by a bit (field) in the frame control of the fragments.

According to the IEEE 802.11-1999 standard, CTS should be sent with the same link rate as RTS, and ACK should be sent with the same link rate as DATA. The original purpose is to enable the originating or transmitting station (e.g., the station T of FIG. 1) to calculate the duration value prior to RTS transmission.

FIG. 5 shows a detailed example of two stations attempting to access a channel through the RTS-CTS phase. In FIG. 5, each time slot=9 microseconds, the SIFS (Short Inter-Frame Spaces) time=16 microseconds, a CCA (carrier sense) time<4 microseconds, a min CW (Contention Window)=15 time slots, a max CW=1023 time slots, an air propagation time<<1 microsecond (in FIG. 5, it is 0 microseconds), DIFS=SIFS+2 time slots=34 microseconds, RTS=52 microseconds @ 6 megabytes/second (RTS=24 microseconds @ 54 megabytes/second), and CTS=44 microseconds @ 6 megabytes/second (CTS=24 microseconds @ 54 megabytes/second).

International Publication No. WO-9501020 A discloses that each station in a wireless LAN (Local Area Network), using time-distributed multiple access control, listens to traffic using the network communications channel, for example, for spread-spectrum, frequency-hopping transmissions. Each station constructs its own network allocation vector from the received transmission contents, indicating when the channel will be in use. Message transmission uses four-way handshaking with two short control packets, "Request to send" (RTS) and "Clear to send" (CTS). The RTS packet includes the data transmission length, enabling the various receiving stations in the network to reserve and block their use of the communications channel over the period of time concerned. The CTS packet repeats this data length, for the benefit of receiving stations not within range of the source transmission. This document corresponds to the IEEE 802.11 standard defined in the IEEE 802.11-1999 standard.

Some ideas regarding transmission power control in DBTMA (Dual Busy Tone Multiple Access), are described in S.-L. Wu, Y.-C. Tseng, and J.-P. Sheu, "Intelligent Medium Access for Mobile Ad Hoc Networks with Busy Tones and Power Control". Int'l Conf. on Computer Communications and Networks, 1999, pp. 71-76. DBTMA is an extension of BTMA with dual busy tones instead of a single busy tone.

However, power control is not supported in known RTS-CTS based channel access schemes.

With respect to DBTMA with TPC, BTMA (Busy Tone Multiple Access) as such is generally not a viable solution for distributed channel access as it is extremely unpractical. It is merely used as a simple system to study in the academic literature. Also, control messages use maximum Transmit Power (TP), and therefore it is not possible for control messages to share a channel with data traffic as that would cause harmful interference peaks for data reception. Another drawback is that information regarding fixed TP is assumed known at the receiver. In addition, DBTMA with TPC only attempts to solve a problem in a specific situation, namely in a distributed system where stations are neither associated with APs, nor associated in a group with other stations. Another drawback is that asymmetries in interference, link gain, or TP capabilities are not been considered.

There are also additional problems common to each of general RTS-CTS, IEEE 802.11 and DBTMA, namely a) link adaptation has not been considered in the RTS-CTS framework, and b) asymmetries in terms of link adaptation capabilities have not been considered.

SUMMARY OF THE INVENTION

Exemplary embodiments of the invention take a more far-reaching transmit power-control (TPC) approach than outlined IEEE 802.11 TGh, and have the objective of improving the overall system performance in IEEE 802.11a as well as other RTS-CTS based channel access scheme to the greatest feasible extent In doing so, this will implicitly address QoS goals considered in IEEE 802.11 TGe.

A further goal of the invention is to address the issue of link adaptation (LA) in conjunction with RTS-CTS frame exchange.

A further goal of the invention is to address the issue of link adaptation (LA) in a common framework with TPC.

In accordance with an exemplary embodiment of the invention, a method for closed loop link adaptation based on a Request To Send-Clear To Send (RTS-CTS) channel access scheme includes the following steps. Designating a station as an originating station. Transmitting a RTS frame with predetermined transmit power from an originating station, prior to an intended DATA transmission, sounding the channel such that reception characteristics can be evaluated at a designated receiving station. Transmitting, in response to the originating station, a CTS frame with a predetermined transmit power from the receiving station with directives of link adaptations. Transmitting a DATA frame from the originating station to the receiving station frame complying with link adjustment directives to the extent of the originating stations capabilities. Transmitting an acknowledge (ACK) frame in response to the originating stations from the receiving station indicating result of DATA frame reception.

In accordance with another exemplary embodiment of the invention, a method for open loop group transmit power control in an infrastructureless system (i.e. an IBSS or Independent Basic Service Set), includes the following steps. Transmitting a frame conveying transmit power information for the corresponding frame to any proximate station. Receiving, by one of the proximate stations, the frame and determining the path gain based on measured signal strength of the received frame and respective transmit power information conveyed in the received frame. Selecting path gains originating from the same group (i.e., IBSS). Determining a required transmit power to reach nodes associated with any of the selected path gains. Selecting the minimum of the highest transmit power and allowed transmit power, wherein the allowed transmit power is determined by regulatory requirements and stations transmit power capabilities. Assigning the selected transmit power to Request To Send (RTS), Clear To Send (CTS) messages and other frames destined for nodes associated with any of the selected path gains.

In accordance with another exemplary embodiment of the invention a method for open loop group transmit power control in an infrastructure system (i.e., a BSS or Basic Service Set), includes the following steps. Selecting, by an access point (AP), at least one station within a group. Transmitting a transmit power information request from an AP to the at least one selected stations. Transmitting a transmit power response with transmit power information for the corresponding frame to any proximate station from the at least one selected stations in an orderly manner preventing collisions. Receiving the frame with the transmit power response and determining the path gain based on measured signal strength of the received frame and respective transmit power information in the received frame. Selecting path gains originating from the same group (i.e., BSS). Determining required transmit power to reach nodes associated with any of the selected path gains. Selecting the minimum of the highest transmit power and allowed transmit power, wherein the allowed transmit power is determined by regulatory requirements and stations transmit power capabilities. Assigning the selected transmit power to Request To Send (RTS), Clear To Send (CTS) messages and other frames destined for nodes associated with any of the selected path gains.

In accordance with another exemplary embodiment of the invention, a method of tiered transmit power includes the steps of determining a sequence of frames that must be exchanged for successful communication, and assigning different transmit power levels to those frames wherein the frames have different topological objectives or distance objectives.

In accordance with another exemplary embodiment of the invention, a method for interference mitigation based on open loop transmit power control enabling tighter medium reuse, includes the following steps. Conveying transmit power control information for and in every transmitted frame by any station transmitting. Receiving frames and determining a path gain based on measured signal strength of the received frames and respective transmit power information conveyed by the received frames. Determining the maximum instantaneously allowed transmit power based on all overheard frames such that ongoing communication is not noticeably disturbed. Conditioning transmit power, and if feasible and necessary, reducing transmit power and other transmit parameters (e.g., link rate etc), to ensure that the maximum transmit power condition is not exceeded during any transmission attempt.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein:

FIG. 5 shows two sources or originating stations/nodes attempting to access the same channel in IEEE 802.11a.

FIG. 7 shows an example of Joint TPC and LA on DATA with an optional extension to ACK in accordance with exemplary embodiments of the invention.

FIG. 8 shows TPC information derived from a BEACON in IBSS in accordance with exemplary embodiments of the invention.

FIG. 18 shows a table describing a TPC policy following a tiered approach in accordance with exemplary embodiments of the invention.

FIG. 19 shows a Transmit Power Information Request Element format in accordance with exemplary embodiments of the invention.

FIG. 20 shows a Transmit Power Information Element format in accordance with exemplary embodiments of the invention.

FIG. 21 shows BEACON modifications in accordance with exemplary embodiments of the invention.

FIG. 22 shows Probe Request modifications in accordance with exemplary embodiments of the invention.

FIG. 23 shows Probe Response modifications in accordance with exemplary embodiments of the invention.

FIG. 24 shows a $P_{TX}$ Request format in accordance with exemplary embodiments of the invention.

DETAILED DESCRIPTION OF THE PREFERRED EMBODIMENTS

Figure 1A:
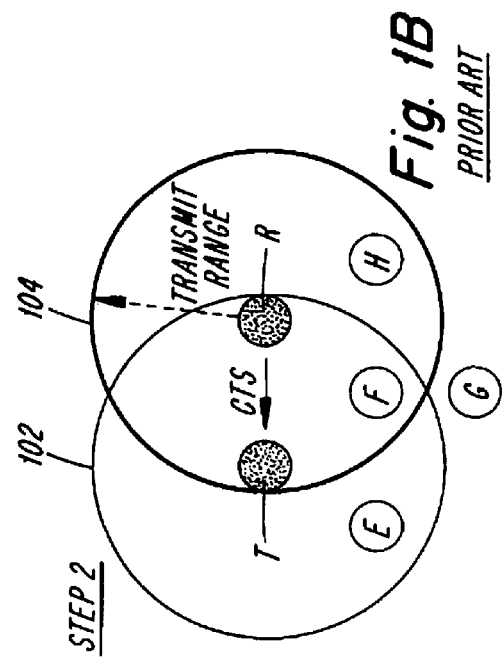
FIGS. 1A-1D show an RTS-CTS-DATA-ACK message exchange.

European Regulatory requirements for the "5 GHz band" defined by ERC (European Radiocommunications Committee), limits the mean EIRP (Effective Isotropically Radiated Power) to 200 mW and 1 W, in the 5150-5350 MHz (indoor) and the 5470-5725 MHz (indoor and outdoor) band respectively. Further, DFS (Distributed Frequency Selection) shall be applied over both bands in conjunction with TPC (Transmit Power Control), the latter operating both in down and uplink. IEEE 802.11 devices operating in the ERC area must therefore comply with stated conditions. As the IEEE 802.11 standard currently does not incorporate the required TPC mechanisms, it is an objective of exemplary embodiments of the present invention to present methods with respect to TPC, such that ERC directives can be fulfilled. In doing so, it is a further objective of exemplary embodiments of the present invention to provide TPC methods enabling link and system performance enhancements.

Exemplary embodiments of the present invention can be applied in both infrastructure-based 802.11 WLANs with an AP (Access Point), or Infrastructure BSS (Basic Service Set), as well as ad hoc-oriented 802.11 networks, or independent BSS (IBSS). DCF (Distributed Coordination Function) has often been the preferred mode of operation as well as the fundamental channel access mode of 802.11. Against that background, a TPC scheme taking the DCF mode as a starting point is consistent with exemplary embodiments of the invention. Exemplary embodiments of the present invention can be extended or implemented to support the (E)PCF (Point Coordination Function) or the HCF (Hybrid Coordination Function) mode.

Exemplary embodiments of the present invention enable not just compliance with ERC requirements, but also enable significant enhancement of system performance in terms of throughput, delay and prolonged battery life. Exemplary embodiments of the present invention also provide mechanisms and procedures to implicitly enhance experienced QoS (Quality of Service) as well as reduce the need for overlap BSS handling. In accordance with exemplary embodiments of the invention, TPC for IEEE 802.11 is proposed with some modification in the current 802.11 MAC specification that may be incorporated as part of the changes within the 802.11e framework.

In accordance with exemplary embodiments of the invention, methods, protocols and frame structures are disclosed that enable both joint and independent TPC and LA (Link Adaptation) in conjunction with a RTS/CTS based channel access scheme. In accordance with exemplary embodiments of the invention, mechanisms are provided to differentiate TPC depending on topological goals. In an exemplary embodiment of the invention, Group based TPC mechanisms for frames like RTS and CTS are provided. Note that the term "group" is synonymous with the collection of all stations in a BSS or in an IBSS, but can also be interpreted in other groupings not specified by or explicitly defined in IEEE 802.11. Exemplary embodiments of the present invention also provide a TPC mechanism for interference mitigation, such that stations belonging to other Groups (BSSs or IBSSs, where "BSS" stands for Basic Service Set and "IBSS" stands for Independent Basic Service Set) are not interfered with. At the same time this enables reuse of the channel provided a suitable TP (Transmit Power) level is selected. Interference mitigation mechanisms may alternatively be employed within a group, e.g., an infinite large and dispersed group. In accordance with exemplary embodiments of the present invention, as a basis for those mechanisms, both closed loop as well as open loop TPC are applied.

In reducing generated interference and minimizing power consumption, it is vital to apply the most aggressive and precise TPC scheme to the bulk traffic of the network, most likely consisting of DATA (and ACK) frames. Next to DATA frames, the RTS and CTS frames may, depending on the adot11Threshold value, be relatively prevalent and hence considered as important contributors to undesired interference and power consumption. As RTS and CTS frames in general are shorter than DATA frames, their supplement to the overall average interference picture will accordingly also be lower. Frames occurring merely occasionally, such as Beacons, have even lesser impact on the average interference situation. In addition, of diminishing the radiated average interference level, the issue of minimizing peak interference and associated variations is also of interest. Different traffic conditions may alter assumptions above, but the given statements are believed to be true in most if not all relevant scenarios. Those issues together with the objectives set forth earlier motivate the following two items. First, a so-called TPC policy to be defined, giving very rough guidelines on TP algorithmic goals. Second, a TPC mechanism to be defined, designed to support the TPC policies.

One aspect of the invention is to enable a tiered TPC policy in a CTS/RTS based channel access system. The motivation for this is that different topological and communication range aspects need to be met depending on frame type. Note that those frames, as the one in IEEE 802.11, have a timely and logical relation to each other. In accordance with exemplary embodiments of the invention, the TPC policy follows a tiered approach defining three levels. Frames with different topological destination objectives are divided among those three Tier-classes. FIG. 18 shows the three major TPC tiers.

As Tier 1 frames are sent with high transmit power, this class also adopts a policy of being constrained in time. The reason is to minimize random interference peaks within and towards neighboring (I)BSS. This may be achieved by confining Tier 1 traffic around Beacon transmit occasions, i.e. sent regularly around TBTT (Target Beacon Transmission Time).

In Tier 1, Beacon TPC, the BEACON frame as defined in the IEEE 802.11-1999 standard, and other conceivable frames/messages with similar topological destination purposes, must generally reach as far as possible. However, those must also conform to regulatory requirements in terms of used TP. As in the IEEE 802.11-1999 standard, such messages are often scheduled at regular time intervals and having priorities above other traffic and may therefore transmit at fixed but the highest permitted TP.

In Tier 2, relating to RTS, CTS and TPC, two major embodiments or cases exist. In the first embodiment, Fixed TPC, RTS/CTS are sent with the highest possible TP, but are limited by regulatory TP requirements. Hence the TP setting is identical to the Beacon information. The purpose of this embodiment is to be able to inform distant stations of ongoing DATA transmissions such that they can select DATA transmit parameters that will mitigate generation of disturbing interference. Although not supported by 802.11 per se, it should be noted that RTS/CTS frames could, in principle, be sent in a special control channel separated from data transmissions, hence avoiding interfering with said data transmissions.

In the second embodiment, Group TPC, the RTS and CTS are sent with a sufficiently high TP so as to reach members or stations within the same group/BSS, but preferably with a sufficiently low TP so as to a) not reach members within another group, and b) stay within regulatory TP requirements and limits. In this second embodiment one purpose is to reduce the interference impact on other stations' DATA transmissions due to RTS/CTS message exchange, when RTS, CTS messages are sent in the same channel and potentially concurrently with DATA transmissions.

Figure 5:
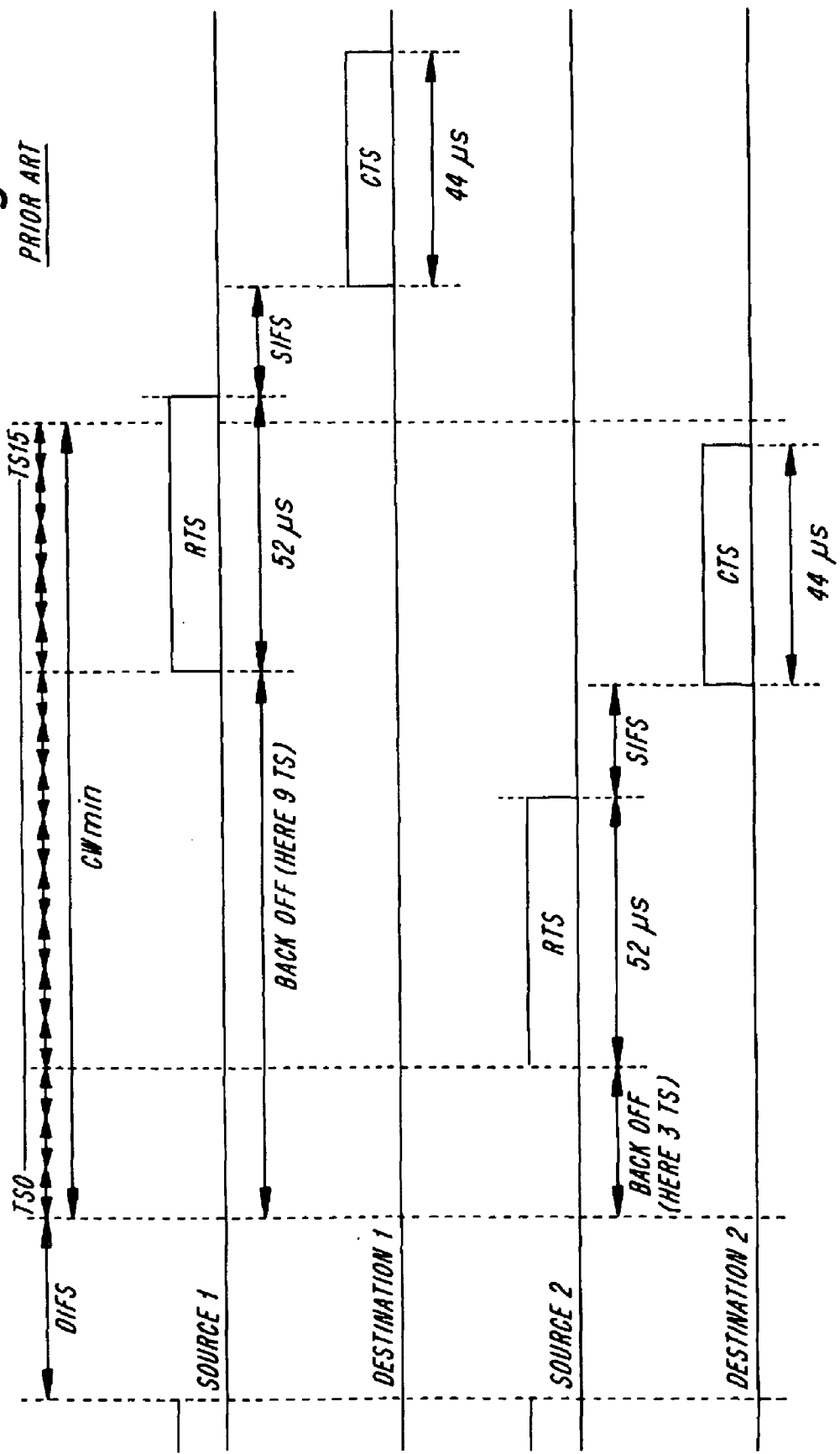

It is worthwhile to further clarify reasons for performing or enabling group oriented TPC, because the conventional, known RTS-CTS scheme does not inherently solve this. FIG. 5 shows a case where two IEEE 802.11a stations belonging to the same group attempt to get control over the medium by sending RTSs and CTSs, with link rates of 6 Mbps. Due to unfortunate time relations between the duration of the RTS start to the CTS end, in relation to 802.11a's timeslot (TS) structure, the virtual carrier sense for source 1 (assumed hidden to source 2) will only work roughly 12 TSs after source 2 accessed the medium first. However, the physical carrier sense of source 1 would need roughly 8 TSs to detect the CTS from destination 2. As a result, while virtual carrier sense mitigates hidden terminals for the duration of data reception when the channel has been reserved, the traditional carrier sense function is still required in the RTS-CTS phase for IEEE 802.11 (a). A further consequence is that it is vital that stations belonging to the same group, and hence sharing the channel, employ transmit powers such that all stations within the group can be reached. For very large contention windows and higher link rates (e.g. 54 Mbps), the impact of this curious blocking effect may be lowered. However, in IEEE 802.11, the reason to use the larger contention windows occurs only when traffic intensity is high, but then it remains quite likely that two STAs will still access the channel within e.g., 8 TSs.

In accordance with an exemplary embodiment of the invention, each RTS-CTS phase is housed within a single time slot, so that the TPC can also rely on the relaying function through the CTS frame.

In a variant of the Tier 2 second embodiment, group based TPC is performed for the CTS message, while applying a lowest possible TP for the RTS frame. This primarily targets the case where the RTS-CTS phase can be housed within a single TS, i.e. not a IEEE 802.11a system. The motivation for this is that DATA reception is more vulnerable than the reception of ACKs, due to the potentially longer interference exposure time for the DATA frame.

In Tier 3, with respect to DATA, ACK TPC+LA, for DATA transmission an Instantaneous Closed Loop TPC and Instantaneous Closed Loop LA is deployed via feedback information conveyed in the CTS messages. In addition to this, DATA TPC also conforms to regulatory aspects as well as the RTS/CTS TPC setting. TPC and LA (Link Adaptation) for ACK generally follows the parameters for DATA. A special case is fragmented transmission when DATA and ACK headers acts as implicit RTS and CTS messages. Then the DATA, ACK and TPC may optionally become equivalent to RTS, CTS and TPC.

The tiered TPC policy can be summarized as:

$$P_{TX}(DATA,ACK) \leq P_{TX}(RTS,CTS) \leq P_{TX}(Beacon) \leq P_{TX}(\text{Regulatory requirements}) \quad (1)$$

Figure 6:
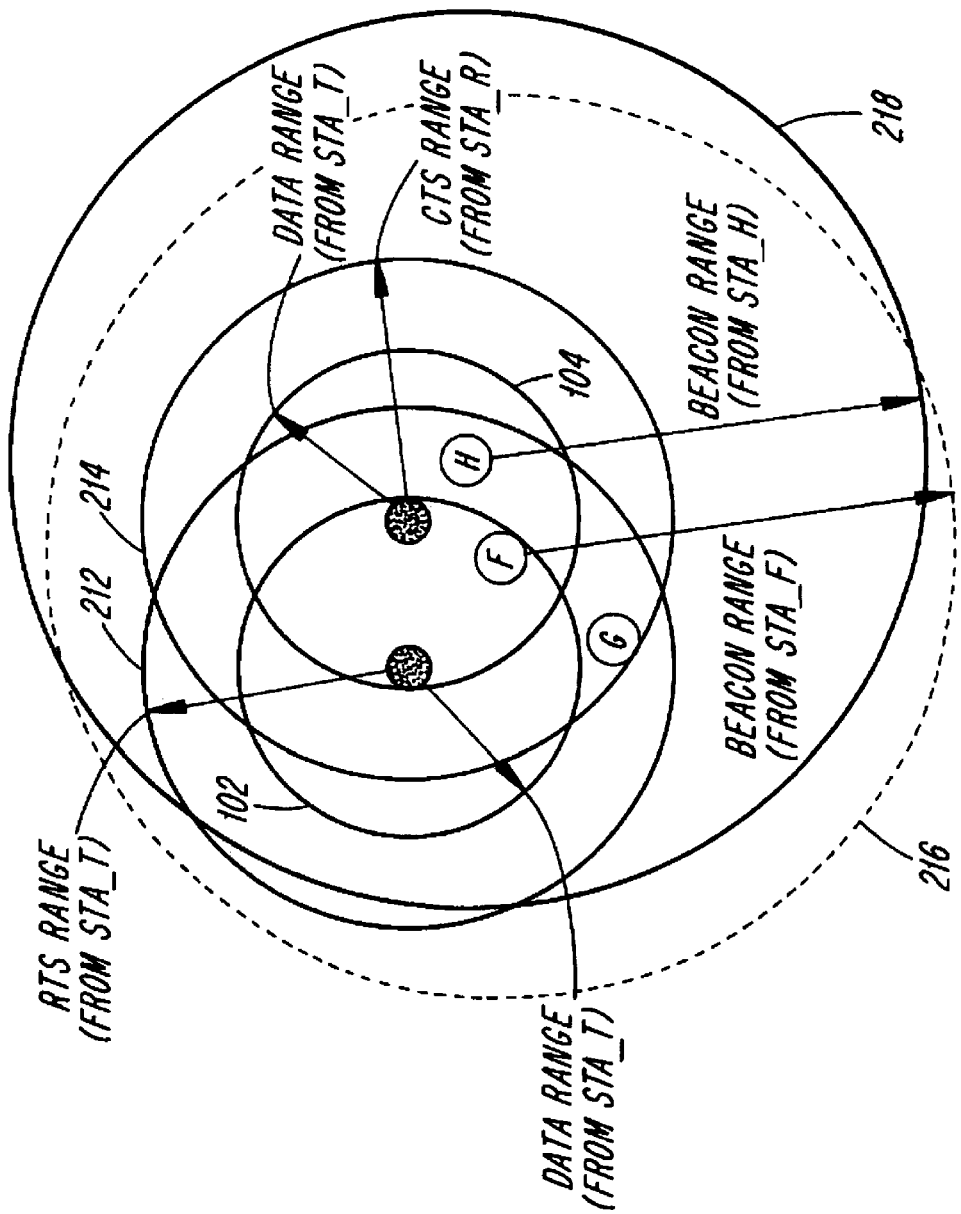
FIG. 6 shows an example of a Tiered TPC in an IBSS-like system in accordance with exemplary embodiments of the invention.

An illustrative but simplified example of an IBSS-like system is shown in FIG. 6, which illustrates how different TP settings for different frames result in different transmit ranges. The second embodiment of Tier 2 (i.e., Case 2 of RTS-CTS TPC) is utilized. Note, in an IBSS, all stations send beacons occasionally and regularly, but merely two beacon ranges are shown here for simplicity. As specifically shown in FIG. 6, the ring 102 is the DATA transmission range for the station T, and the ring 104 is the DATA transmission range for the station R. A ring 212 is the RTS transmission range for the station T, and the ring 214 is the RTS transmission range for the station R. As can be seen, the rings 212, 214 are larger than the rings 102, 104. Larger yet are the rings 216, 218, which are the BEACON transmission ranges of the stations F, H respectively.

With respect to Tier 3, each node or station receiving an RTS message assesses preferably the instantaneous carrier to interference ratio, CIR, and other channel parameters of choice. Subsequently, a desired reduction or increase of transmit power used for the RTS frame is determined. A relative transmit power adjustment request $P_{TX\_Request}$ is then conveyed in the CTS message back to the originating station. The originating station adjusts the transmit power level accordingly for the subsequent DATA frame transmission. The same procedure is repeated for the ACK, i.e., the originating station conveys a corresponding transmit power adjustment request targeted for the ACK. Note that both RTS and CTS are sent with TPC Tier 2 related mechanisms described further below. The details of selecting the transmit power are implementation specific, but the mechanism as such inherently enables a very precise adjustment with respect to instantaneous experienced CIR at the receiver. An example of the flexibility given is that the implementation specific algorithm can always respond (for example, to an RTS) with a $P_{TX\_Request}$, thereby forcing the sender of DATA to use full permitted domain transmit power. While this is indeed possible, it generally results in a poor-performing system, as spatial reuse is reduced and power consumption increased. Note that in sending short Data or Management frames that do not exploit the RTS-CTS scheme, information derived from the open loop group TPC can be used. This is of particular interest when data or management frames are sent through multicast or broadcast to a group of receivers.

For Tier 3 closed loop DATA TPC, DATA LA and joint TPC and LA for DATA, consider the following example. Assuming that a station T has a data packet to send to a station R and that the employed channel access scheme with back off and similar features has already acted, the station T sends a RTS message with a TP of $P_{TX}(RTS)$ to station R. This transmission can be conditioned so that it does not harm any ongoing communication.

Station R receives the RTS frame and determines the received power $P_{TX}(RTS)$ and other optional link characteristics that can provide additional guidance to the LA and the TPC algorithms. Optional link characteristics may include channel state information or simply delay spread information.

The station R also experiences and measures interference $I_{RX}$ at the same time from some other station(s) and other interference characteristics that can provide additional guidance to the LA and the TPC algorithms.

In a successive step, $P_{RX}(RTS)$ with other optional link characteristics, interference $I_{RX}$ with other interference characteristics and knowledge about noise is used by the station R to determine settings for the DATA transmission from station T to station R.

In one preferred step, link, interference and noise knowledge are used by the station R to determine changes in TP relative the TP employed for the RTS message, for example closed loop with signaling of relative change.

In an alternative but also preferred step, link, interference and noise knowledge are used by the station R to determine settings of the LA based on the TP employed for the RTS message.

In a combined step, both LA and TP settings are determined by the station R. In a successive step, determined link control information is transferred in the CTS frame to the station T. The CTS transmission can be conditioned so that it does not harm any ongoing communication. In a successive step, the station T uses the settings indicated in the link control information received in the CTS message when sending DATA. This transmission can be conditioned so that it does not harm any ongoing communication.

In an additional step of the invention, the procedure is repeated for successive and consecutive frame exchanges.

Accordingly, the DATA frame carries link control information for the ACK frame that adjusts its TP relative the CTS message. Although not originally permitted in IEEE 802.11, the ACK rate can be adapted as determined by the originating station T in future systems.

In addition, when IEEE 802.11 employs fragmentation, DATA and ACK act as RTS and CTS frames and will then convey link control information where the power control also relates to the last sent frame. Optionally, the RTS and CTS messages are sent with duration field indications covering the expected duration. This transmission can be conditioned so that it does not harm any ongoing communication.

FIG. 7 shows the principle of closed loop joint TPC and LA based on RTS-CTS frame exchange. Option 1 allows an adaptation of TP and LA for the ACK. Note that according to the IEEE 802.11-1999 standard, DATA and ACK should use the same LA scheme. However, future extensions or the development of similar systems are not excluded. As shown in FIG. 7, in a first step 702 the originating station T sets RTS power to $P_{TX}$(RTS), and then in step 704 sends the RTS to the station R. In step 704, the station R measures $P_{RX}$(RTS) and $I_{RX}$, and determines $P_{TX}$(DATA) and LA(DATA) and then conveys the determined information in the CTS in step 708 to the station T. In step 710 the station T makes adjustments according to the determined $P_{TX}$(DATA) and LA(DATA) received in the CTS. Optionally, the station T also measures $P_{RX}$(CTS) and $I_{RX}$, determines $P_{TX}$(ACK) and LA(ACK), and then adds this determined information into the DATA. Then in step 712, the station T transmits the DATA to the station R. In step 714, the station R makes appropriate adjustments if the received data included $P_{TX}$(ACK) and LA(ACK), and then in step 716 the station R sends an ACK to the station T.

With respect to conditions for not harming other communication, at least two exemplary options exist. A first option follows the legacy channel access principle for IEEE 802.11, i.e., when the physical or the virtual carrier sense indicates that the channel is occupied, access is deferred. A drawback of this state of the art technique is that it does not attempt to reuse the channel even when it would be possible as TPC is employed.

A second alternative option in accordance with exemplary embodiments of the invention, exploits overheard information of TP indications and maximum allowed receive power. Such information may be included in, and derived from, the header information of primarily RTS and CTS frames, but also DATA, ACK and possibly other frames. This scheme is described in greater detail further below, and is also referred to as Interference Mitigation.

For Tier 1, BEACON TPC, the allowed transmit power level allows domain specific settings. Each station within an (I)BSS uses the allowed domain transmit power when sending a frame containing any of the appropriate IEs defined in FIGS. 19-23. If the transmit power capability is lower than the domain transmit power level, the former will be used. For IEEE 802.11 the setting of Beacon TP is determined by IEEE 802.11 management information base, MIB of the node initiating a (I)BSS. For the IBSS, the TPC setting for the BEACON is distributed as an Information Element, IE, conveyed in the BEACON itself. The frame format and procedure for this are described further below.

With respect to Tier 2 (e.g., RTS, CTS TPC), the aim is to determine a transmit power setting such that all stations or nodes within an (I)BSS will have a sufficient CIR to be able to receive frames. This mechanism is also useful for TPC setting for broadcast and multicast traffic within the (I)BSS, but it is primarily aimed towards RTS and CTS frames.

While the RTS-CTS frame exchange efficiently prevents hidden stations from accessing the channel, further enhanced by the virtual carrier sense, the RTS-CTS frames themselves need to be protected with classical physical carrier sense. As a result, it is vital to ensure that all stations within the same (I)BSS transmit with sufficient power so as to reach each other. However, from the viewpoint of interference and power consumption, it is preferred to send with the least possible transmit power. The Group oriented TPC proposed here intend to strike a balance between those two somewhat conflicting goals.

As indicated earlier, a number of cases need to be differentiated. A first case is Fixed TPC. In a system where the control frames RTS and CTS do not share the channel with DATA transmissions, the need for precise and tight TPC of RTS, CTS messages is lower than if the channel is shared. The channel can be considered not to be shared when RTS, CTS are separated e.g., in time (as for example in a TDD/TDMA structure, where "TDD" stands for Time Division Duplex and "TDMA" stands for Time Division Multiple Access), in code (as for example in DS-CDMA, which stands for Direct Sequence Code Division Multiple Access), or in frequency (as for example in FDD, where "FDD" stands for Frequency Division Duplex). A drawback with the frequency division is that the channel cannot be considered to be reciprocal, and hence the channel gain may differ for RTS, CTS and DATA channels. An additional method to mitigate interference influence from RTS, CTS messages when sharing the channel with DATA is to use a strong burst error correcting code for DATA. As an example, an Reed-Solomon (RS) code of length N RS-symbols with N-K RS-redundant symbols, may correct up to floor ((N−K)/2) unknown RS-symbols or floor ((N−K)) known erroneous RS-symbols. Two exemplary options for the ACK exist. Either it shares the channel with DATA using the same TPC scheme, or it shares the channel with RTS, CTS using the same TPC scheme.

Consequently, the TPC regulates the TP preferably to the permitted level according to regulatory requirements and attainable by the equipment itself. Note that BSS- and IBSS-like systems do not need to be differentiated from TPC point of view here.

A second case is Group TPC. In order to handle both BSS- and IBSS-like systems two methods are deployed.

The procedure for IBSS Group TPC is based on conveying transmit power level information, $P_{TX}$, as an information element, IE, in the regular IBSS Beacon. Hence, $P_{TX}$ merely represents the transmit power employed for the frame in which the IE itself is transferred within. The intent of using the Beacon is because it complies well with both power sleep mode operation as well as the Tier 1 objectives. In addition to the transmit power level information, a minimum required receive power level, $P_{RX}$-min is sent in the same IE.

Each station receiving a Beacon with the IE determines path gain and subsequently required transmit power. Each station also assess that the Beacon originates from a station within the same IBSS. Over the time, as the IBSS Beacon transmit time is somewhat randomized, Beacons from all stations within the same IBSS and within range will be received. Based on the collated information, the maximum required transmit power is selected among the stations. Old transmit power updates lose validity over time as new updates are not overheard.

In an IEEE 802.11 IBSS, each STA (station) will attempt to transmit a BEACON frame at the TBTT plus a random small delay. A STA overhearing another BEACON refrain from transmitting. As the BEACON is transmitted with relatively high power, all STAs within the IBSS have sufficient SNR (Signal to Noise Ratio) to correctly decode the message except collisions occur where decoding may fail.

An additional IE (apart from already existing in the IEEE 802.11-1999 standard) indicates the TP level, $P_{TX}$(BEACON), that is used when sending the BEACON. The IE is incorporated into the BEACON frame itself, as shown for example in FIG. 21. As $P_{TX}$(BEACON) and the received signal strength $P_{RX}$(BEACON) derived from the BEACON frame is known, the path gain can be calculated. This is repeated for all received BEACONS. The minimum path gain from any STA belonging to the same IBSS is subsequently extracted and used to calculate the TP for the RTS and CTS message. Alternatively the TPC Group procedure described below is used when STAs require different minimum receive power.

An advantage of exploiting the BEACON is that Power Save enabled STAs wake up and listen for the BEACON.

FIG. 8 shows a station sending one BEACON that is received by a number of other STAs within the same IBSS. As shown in FIG. 8, a BEACON sending STA (station) first sets $P_{TX}$(BEACON) to a maximum allowed level, and indicates $P_{TX}$(BEACON) in the BEACON. Optionally, the BEACON sending STA (station) also determines $P_{RX\_min}$, and also indicates $P_{RX\_min}$ in the BEACON. Next, the station sends the BEACON to other STAs (stations), and each of the other stations measures $P_{RX}$(BEACON) and then determines path gain and required transmit power.

When $P_{RX\_min}$ is indicated in the BEACON, a more precise determination of required transmit power can be accomplished, as an estimated value of $P_{RX\_min}$ is required if not indicated in the BEACON.

Figure 9B:
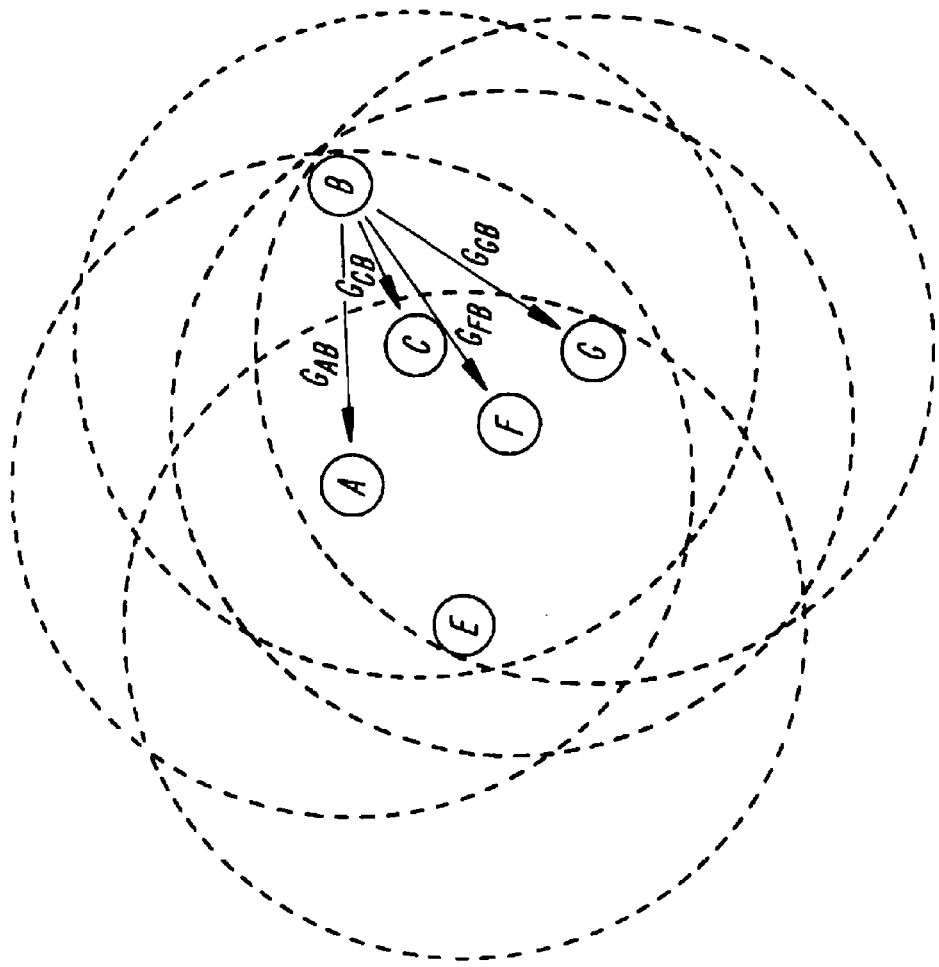
FIGS. 9A and 9B show IBSS path gain estimates from a BEACON in accordance with exemplary embodiments of the invention.
Figure 9A:
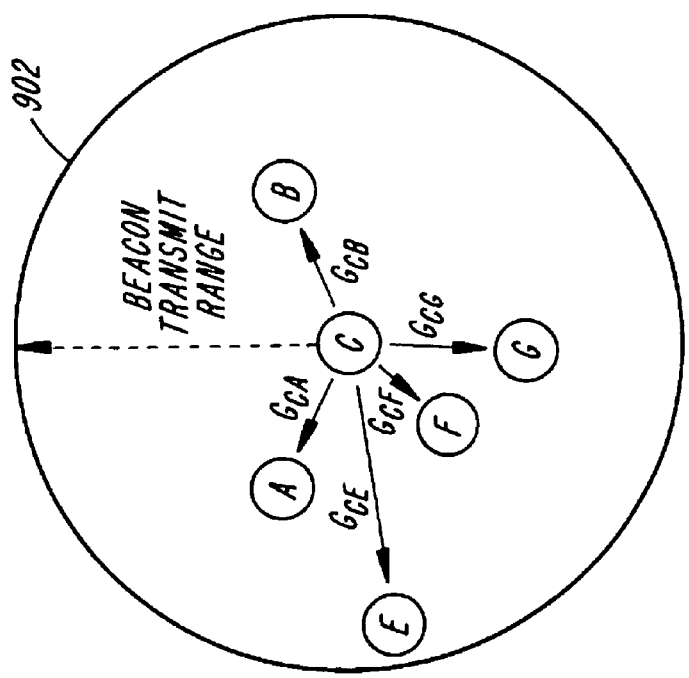

An alternative view of the effect of receiving the BEACON with TPC information conveyed therein is shown in FIGS. 9A-B. The ring 902 indicates a BEACON transmit range of the station or node C, and $G_{CA}$, $G_{CB}$, $G_{CE}$, $G_{CF}$, and $G_{CG}$ respectively represent the path gain from the node C to each of the nodes or stations A, B, E. F and G. First the station C sends a BEACON as shown in FIG. 9A, and subsequently other station will send BEACON At a later instance, each STA will have knowledge about average path gain to each STA, from which they received BEACON(s), within the same IBSS, and possibly also other IBSSs. The illustration in FIG. 9B indicates the path gain knowledge acquired by station B, with path gains $G_{AB}$, $G_{CB}$, $G_{FB}$, $G_{GB}$ between the station B and the stations A, C, F and G respectively. As station moves, the weight of old path gain information is assumed to decrease.

With respect to BSS-like systems in Group TPC, the procedure for BSS group TPC is somewhat similar to the procedure for IBSS, but the channel probing sequence is directed by the AP. A transmit power information request directed towards a selected STA is issued by the AP. This request is sent via an IE, e.g., carried in a Probe request or other suitable frame, e.g., just immediately after the Beacon. Subsequently, a Probe response or other suitable frame is sent back from the addressed STA with another IE indicating the used transmit power information $P_{TX}$ and preferably also a minimum required receive power level, $P_{RX\_min}$. The Probe request and Probe response (or alternative suitable frames) employs the Tier 1 TPC setting rule. Each STA receiving the Probe response (or alternative suitable frames) with the IE, determines path gain and subsequently required transmit power. Each STA also assess that the frame originates from a STA within the same BSS. Over the time, frames with the desired IE from all STAs within the same BSS and within range are received. For each individual STA, the maximum required transmits power is then selected among the STAs with respect taken to changing channel gain over time.

The polling sequence of STAs belonging to a BSS is an implementation specific issue and not defined in the standard. Note that the scheme allows those implementing the scheme to adjust $P_{RX\_min}$ and manage the algorithmic dynamics in any desirable manner. Note also, that by regulating $P_{RX\_min}$, stations will try to adaptively compensate desired receive power in the presence of an adjacent interfering BSSs. Hence if maximum domain transmit power is the optimum, the system will tune transmit power parameters accordingly. In contrast, other situations will conserve the resources instead. Moreover, as Tier 1 information shall not interfere with Tier 2 traffic, due to timely division, interference measurement guiding the setting of $P_{RX\_min}$ should preferably exclude Tier 1 related interference.

Specifically, in an IEEE 802.11 BSS the AP sends the BEACON, whereas non-AP STAs does not send any BEACON, and as a result, the IBSS solution does not work. However, just prior, during, or after the BEACON, the AP performs a TP_Request of non-AP STAs. It requests one or more STAs that belongs to the BSS to send a TP_Response with corresponding TP setting conveyed therein. The TP_Response is preferably sent with the same TP setting as the BEACON is using. It should be noted that STAs within a BSS may use any transmit power indication in the BEACON to determine required transmit power towards the AP.

Various options on how this can be implemented is envisioned, but not limited to the exemplary embodiments given here. A specific TP_Request message is defined as one IE. Another IE is used for TP_Response, indicating the used TP level for the same message it is conveyed in. The TP_Request IE can e.g., be included in a BEACON, PROBE_REQUEST, or a so-called GENERIC_MANAGEMENT FRAME that is currently under development in the standardization of IEEE 802.11 enhancements. The TP_Response IE can e.g., be included in a PROBE_REQUEST, PROBE_RESPONSE or a so-called GENERIC_MANAGEMENT_FRAME.

The TP polling scheme of the AP can for example be accomplished in a round robin fashion or targeted in particular towards STAs expected to be at coverage boarder.

Note that if the group of STAs defined by the BSS or IBSS extends over a large range there is a possibility that TP will be set to the same level as the BEACON TP level for the RTS-CTS frames.

In an optional embodiment, the IE includes not just the used TP $P_{TX}$(FRAME), but also a measure of the minimum required receive power $P_{RX\_min}$. A known lowest link rate is assumed when defining $P_{RX\_min}$.

Figure 10:
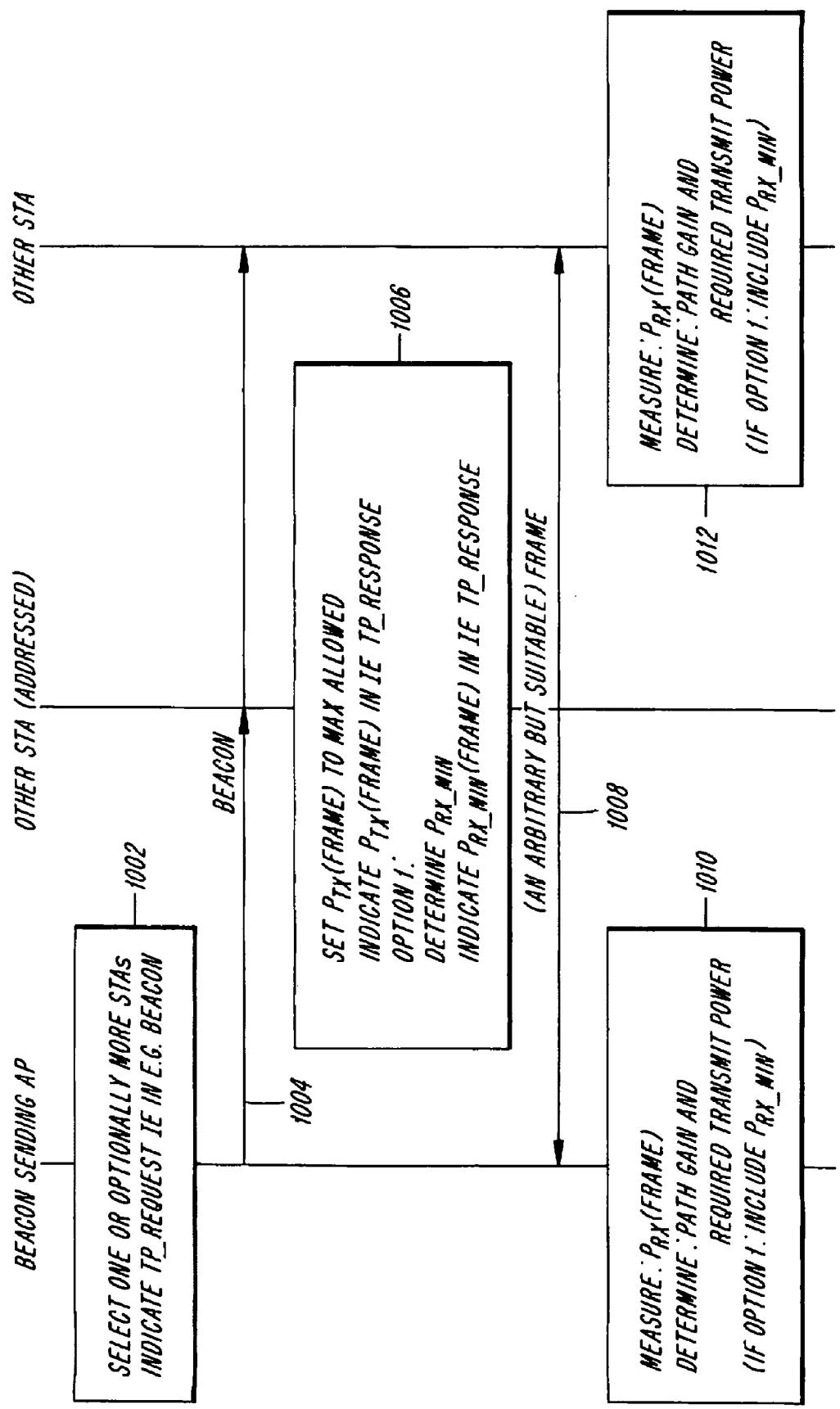
FIG. 10 shows a Request for TP Information issued by an AP and responded to by an addressed station in accordance with exemplary embodiments of the invention.

FIG. 10 shows an exemplary case where an AP issues an TP_Request IE in a BEACON. As shown in FIG. 10, in step 1002 a BEACON sending AP (Access Point) selects one or optionally more stations (STAs), and indicates a TP_Request IE in the BEACON. Then in step 1004, the AP sends the BEACON to the selected, addressed station(s). In step 1006 the addressed station responds to the request by a) setting $P_{TX}$(FRAME) to a maximum allowed level, b) indicating the $P_{TX}$(FRAME) in an IE TP_Response, c) optionally determining $P_{RX\_min}$ and indicating the determined $P_{RX\_min}$ in the IE TP_Response. In the next step 1008, the addressed station issues the TP_Response IE in any suitable frame type. If multiple stations were addressed, they respond in an orderly fashion according to address sequence. Each frame is divided a SIFS (Short Inter-Frame Space) apart. In steps 1010, 1012, the other stations receiving the frame(s) containing the TP_Response IE(s) measure the $P_{RX}$(FRAME), and determine path gain and required transmit power (and optionally include explicit $P_{RX\_min}$ information in the transmit power determination if $P_{RX\_min}$ is received in the TP_Response IE).

Figure 1B:
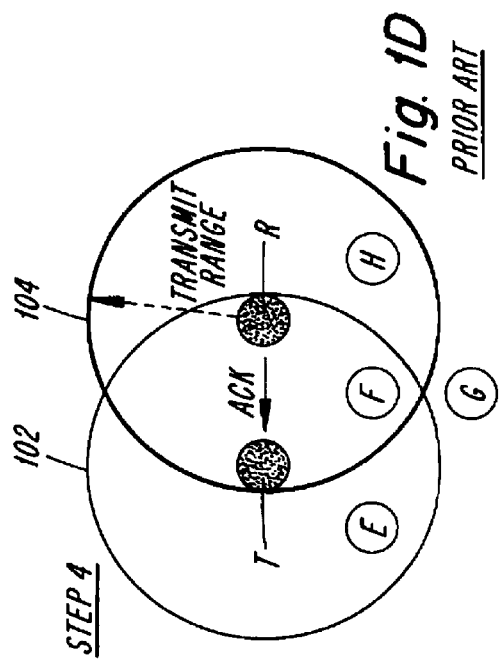
Figure 1C:
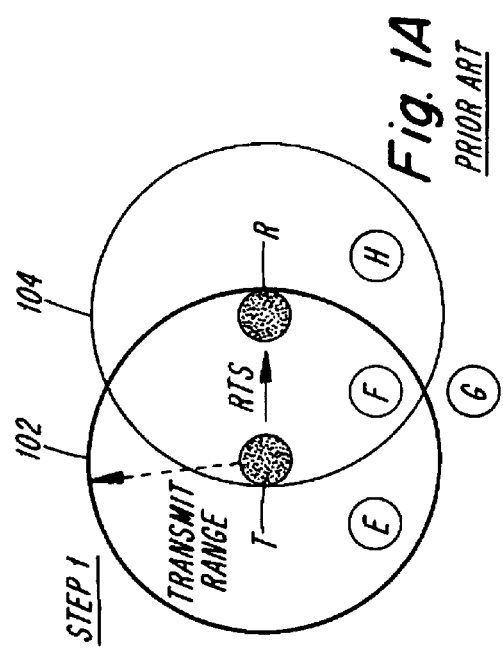
Figure 1D:
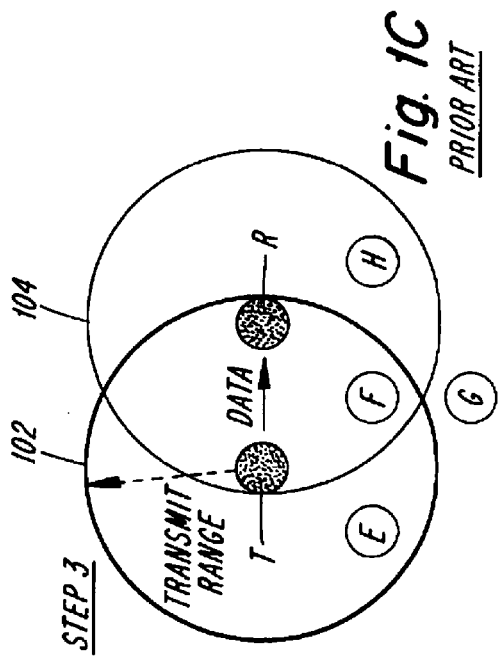
Figure 2:
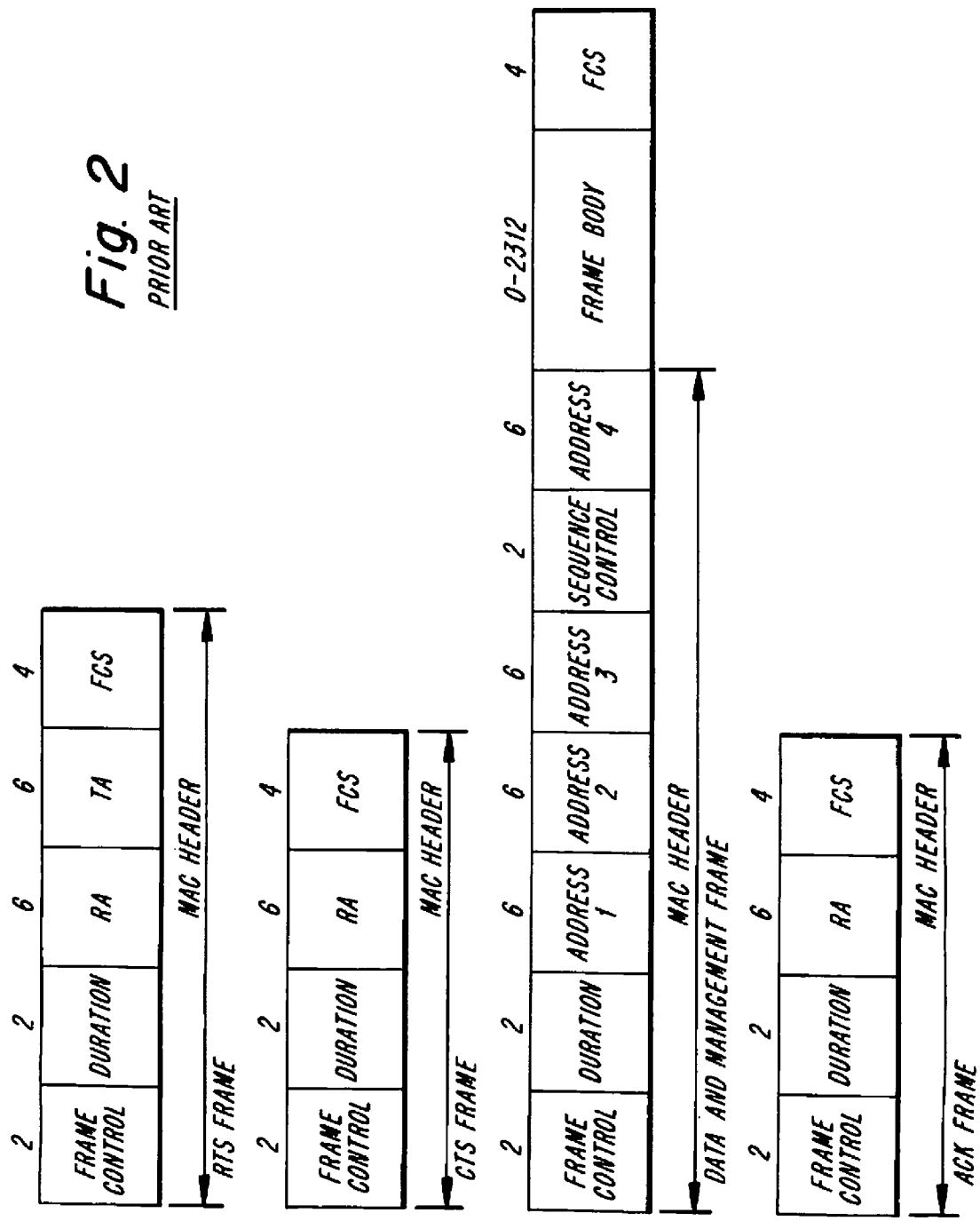
FIG. 2 shows exemplary MAC Frame formats of IEEE 802.11.
Figure 3:
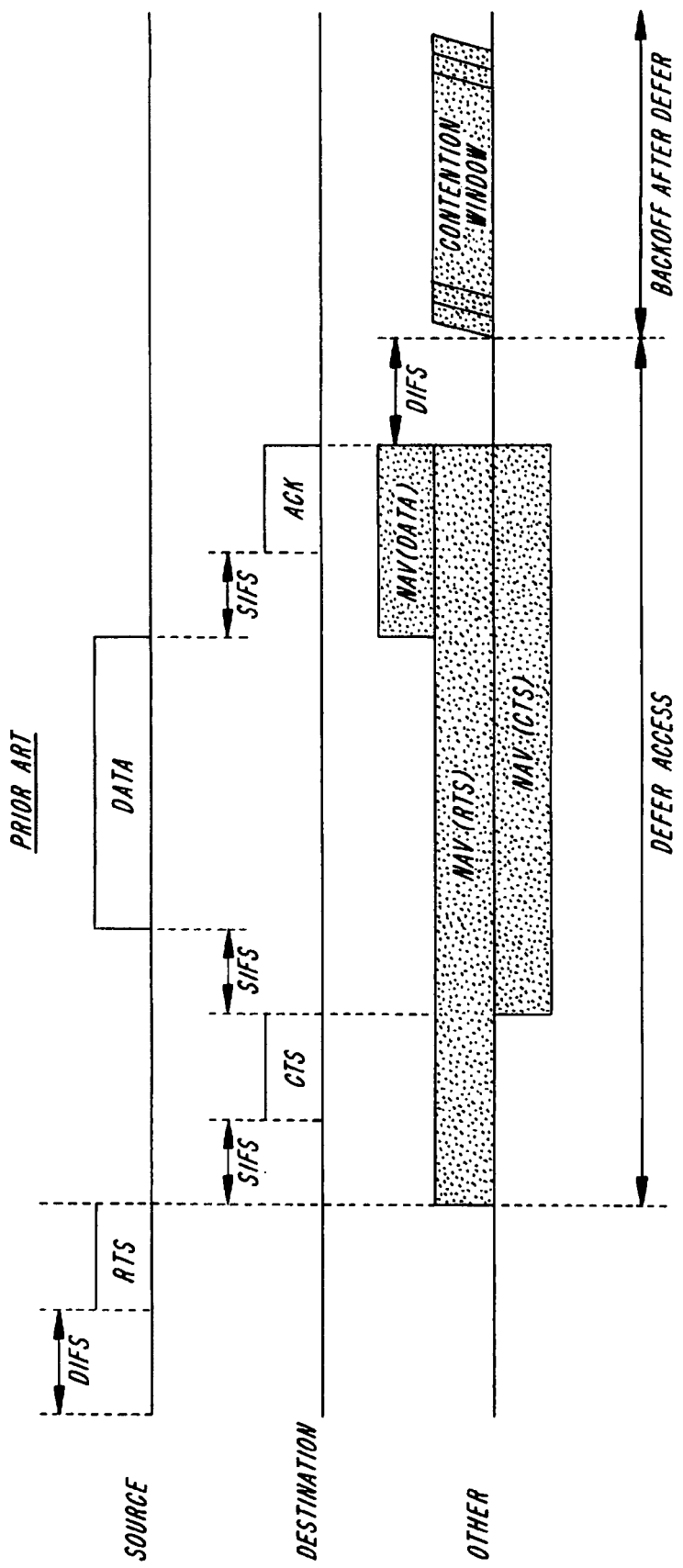
FIG. 3 shows NAV setting together with RTS-CTS.
Figure 4:
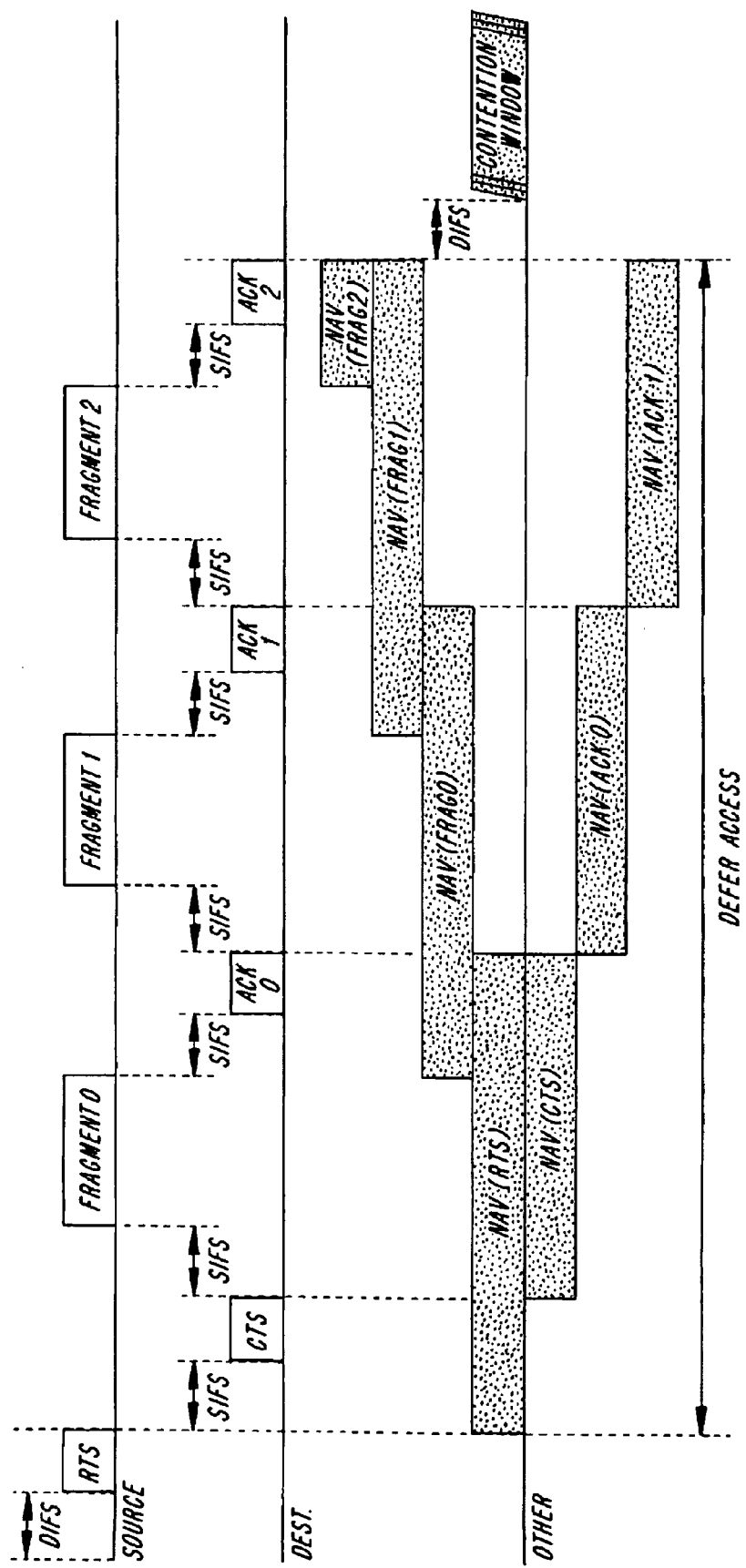
FIG. 4 shows NAV setting when fragmentation is employed together with RTS-CTS.

An alternative view of the TP_Request and TP_Response exchange is shown in FIGS. 1A-B with the calculated path gain indicated. In FIG. 11A, station C is an AP and has a transmit range indicated by the ring 1102, and path gains $G_{CA}$, $G_{CB}$, $G_{CE}$, $G_{CF}$ and $G_{CG}$ from the station C to each of the stations A, B, E, F and G respectively. FIG. 11A also shows a TP request sent from the station C (AP) to the station G.

Figure 11B:
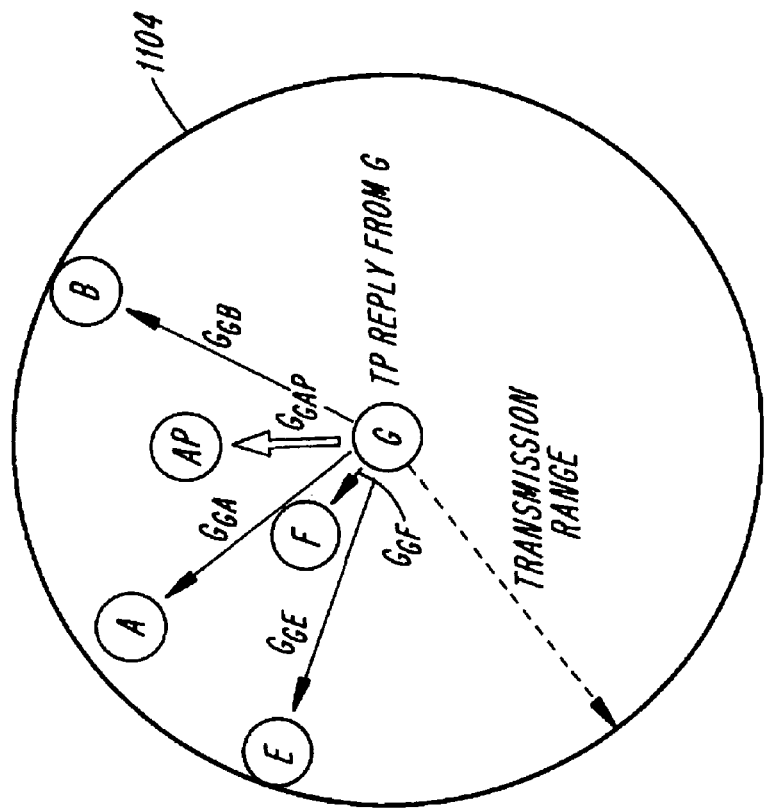
FIG. 11 shows an example of BSS TP_Request, TP_Reply exchange that establishes path-gain knowledge in accordance with exemplary embodiments of the invention.
Figure 11A:
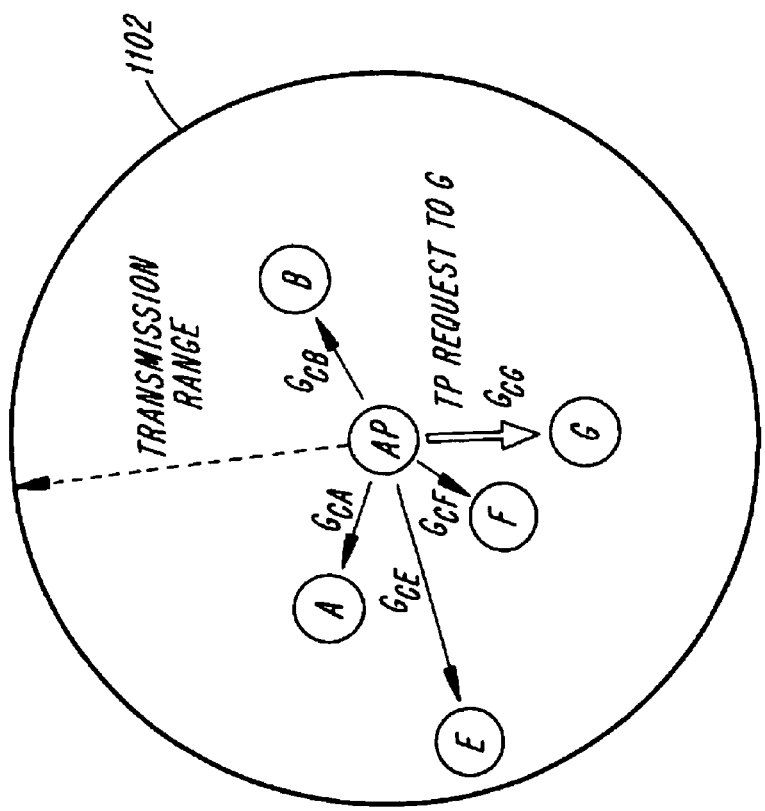

FIG. 11B shows a similar situation, but from the vantage point of the station G. The ring 1104 indicates the transmit range of the station G, and the path gains $G_{GA}$, $G_{GB}$, $G_{GC}$, $G_{GE}$ and $G_{GF}$ from the station G to each of the stations A, B, C (AP), E, and F respectively are shown. Also shown is a TP Response from the station G to the station C (AP).

Figure 12:
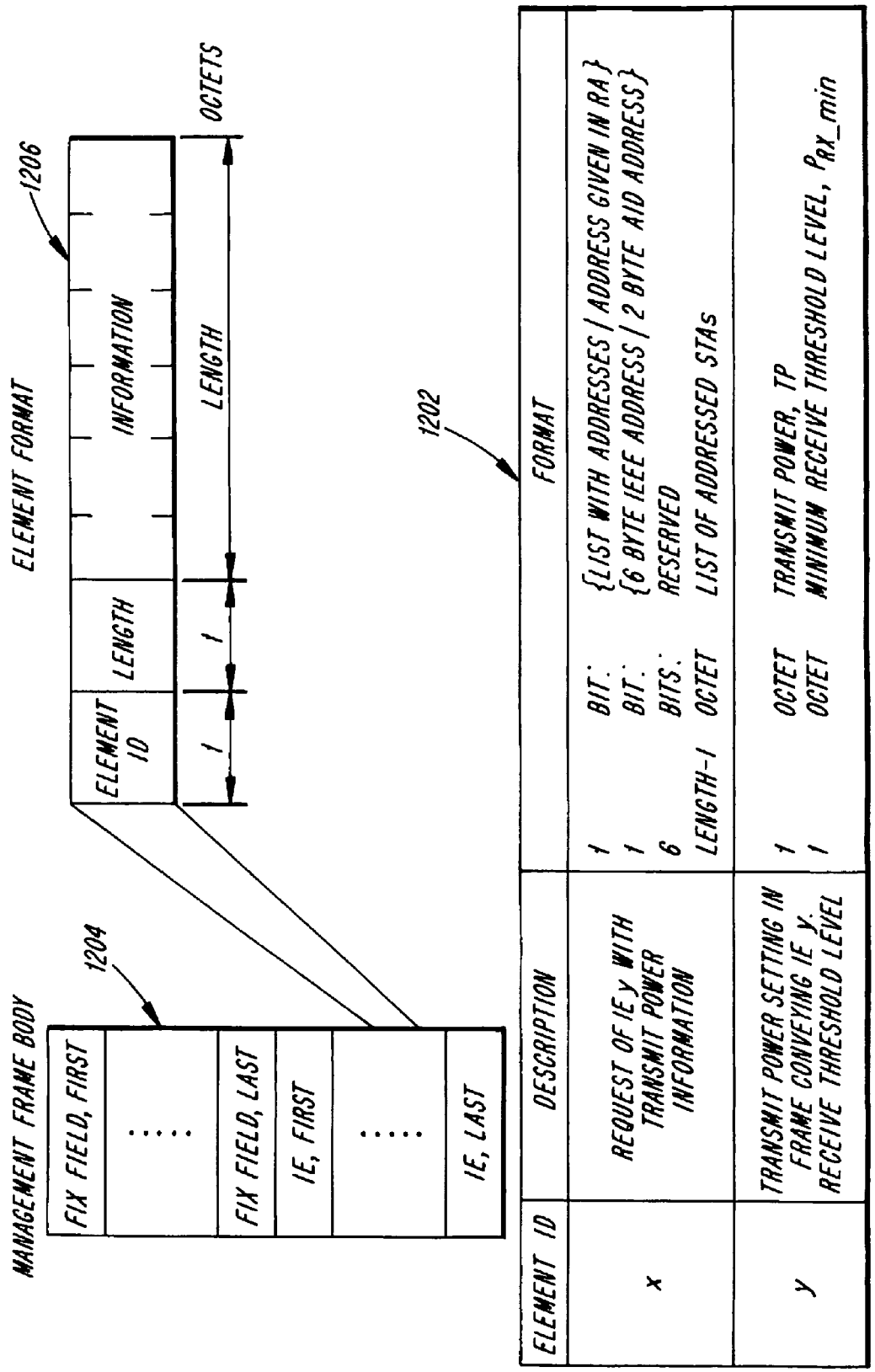
FIG. 12 shows exemplary TP_Request and TP_Reply IEs in accordance with exemplary embodiments of the invention.

Some general aspects pertaining to Case 2 (Group TPC) of Tier 2 are now discussed. In particular, FIG. 12 shows the content of the TP_Request and TP_Reply IE, and their place in a management frame body of arbitrary type. The Management Frame Body 1204 includes multiple Fix fields, and also multiple IEs. Each IE has a format 1206, including an Element ID of 1 octet or byte, a Length field of one octet, and an Information field having a length indicated in the Length field. Note, TP_Request is only used in BSS operation. The table 1202 shown in FIG. 12 describes an exemplary TP_Request format (corresponding to the Element ID x in the table), and describes an exemplary TP_Reply IE format (corresponding to the Element ID y in the table). FIG. 20 also shows an exemplary Transmit Power IE (Information Element) format, and FIG. 19 shows an exemplary Transmit Power Information Request Element format.

FIG. 21 shows how a Management frame subtype BEACON can be modified to include three new IEs, in accordance with exemplary embodiments of the invention. In particular, the 11$^{th}$ IE in the frame can include Domain Information, the 12$^{th}$ IE in the frame can be a Transmit Power Information Request Element, and the 13$^{th}$ IE in the frame can be a Transmit Power Information Element. It should be noted that Transmit Power Information Request Element could also be included in other frames, such as management frames. Also note that Transmit Power Information Element could optionally also be included in the BEACON for a BSS.

FIG. 22 shows how a probe request can be modified in accordance with exemplary embodiments of the invention, to include a Transmit Power Information Request Element. FIG. 23 shows how a probe response can be modified to include a Transmit Power Information Element.

In an exemplary embodiment of the invention, the policy of group TPC may be employed only towards the CTS frame, whereas the RTS frame employs a TP setting with respect to the intended receiver. The schemes depicted earlier for RTS, CTS TPC to acquire group TP level knowledge are hence used merely for the CTS frame. The RTS TP level is determined with an independent algorithm but limited upwards by the TP setting for the CTS frame. Any overheard messages carrying TP information (as described further above, for example) and sent by the intended receiver, may be used as inputs to determine the TP level for the RTS frame.

An exemplary embodiment of the TPC group algorithm includes the following steps: Monitor the channel for messages carrying an IE indicating the TP of the corresponding frame. Next, determine if the IE was sent by a STA k belonging to the same (I)BSS (group) and if so, determine the required TP. If the IE includes interference information, this is also considered when determining the TP $P_{TX}(RTS)_k$. The TP is preferably determined for the lowest data rate, requiring the least TP and hence minimize generated peak interference. Next, set $P_{TX}(RTS)=\max(P_{TX}(RTS)_1 \ldots P_{TX}(RTS)_k, \ldots P_{TX}(RTS)_K)$, where k indexes stations (STAS) within the same (I)BSS (group). The same TP is used for a CTS message, for example $P_{TX}(CTS)=P_{TX}(RTS)$.

In accordance with exemplary embodiments of the invention, a procedure is provided to increase the spatial reuse through Open Loop Interference Mitigation Control as outlined below. With this procedure, a station or node can determine maximum permitted TP and can transmit frames without disturbing (to any noticeable degree) ongoing communication which would not be permitted under the current channel access rules in the IEEE 802.11-1999 standard.

Specifically, TP indications and maximum allowed receive power $P_{RX\_MAX}$ are included in, and derived from, the header information of primarily RTS and CTS frames, but also DATA and ACK frames. The maximum allowed receive power $P_{RX\_MAX}$ is related to the experienced interference and noise level. It is most important to include and detect the information in the CTS frame header as DATA reception is in general more vulnerable for interference compared to e.g., ACK, due to in general longer frames and possibly also higher required CIR resulting from higher link rates. It should be noted that $P_{RX\_max}$ can optionally be determined from the $P_{RX\_min}$ by asserting a level for $P_{RX\_max}$ that is sufficiently smaller than $P_{RX\_min}$.

Figure 13:
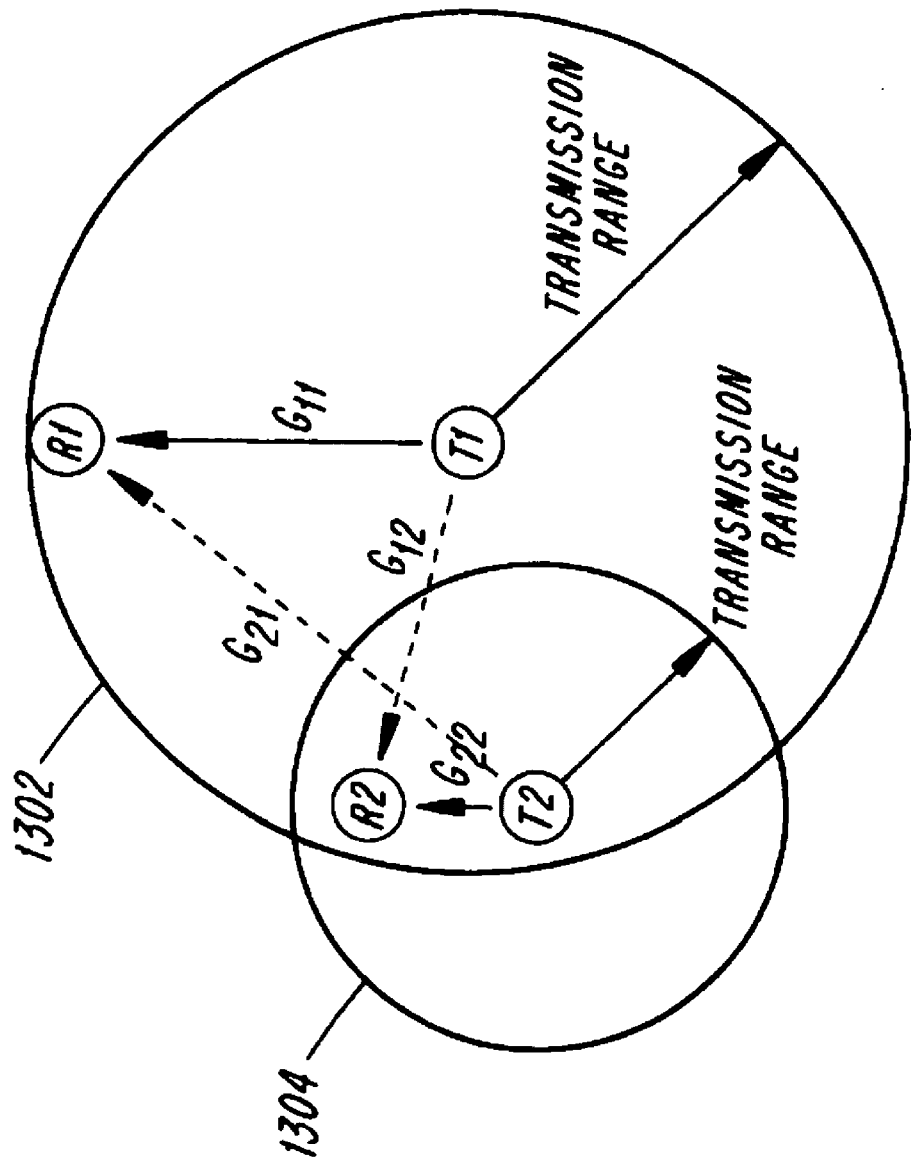
FIG. 13 shows concurrent and adjacent DATA transmissions enabled by TPC in accordance with exemplary embodiments of the invention.

FIG. 13 shows two station pairs, (T1, R1) and (T2, R2) communicating with each other. Path gains $G_{11}$, $G_{12}$, $G_{21}$, $G_{22}$ indicating the path gain between T1 and R1, T1 and R2, T2 and R1, and T2 and R2, are shown. The ring 1302 indicates the transmission range of the station or node T1, and the ring 1304 indicates the transmission range of the station or node T2. Under the traditional IEEE 802.11 rule the station T2 and the station R2 would not normally be able to transmit as station T1 and station R1 are already using the medium. However if the TP for the station pairs can fulfil the conditions $$\frac{C_1}{I_1} = \frac{P_1 \cdot G_{11}}{P_2 \cdot G_{21}} \geq \gamma_{min} \qquad (2)$$

and $$\frac{C_2}{I_2} = \frac{P_2 \cdot G_{22}}{P_1 \cdot G_{12}} \geq \gamma_{min} \qquad (3)$$

where C/I is the interference ratio, P is the transmit power, G is the channel gain and $\gamma_{min}$ is the minimum required C/I ratio for likely reception, then it can be possible to house or permit multiple and "overlapping" transmissions.

Assuming in FIG. 13 that the station T2 has acquired path gain knowledge and maximum allowed receive power from the station R2 (through overhearing earlier CTS with duration indication, for example) it may send a frame (e.g. RTS or DATA) provided that following condition is fulfilled, $$P_2 \leq \frac{P_1 \cdot G_{11}}{\gamma_{min} \cdot G_{21}} = \frac{P_{RX_{max}}}{\gamma_{min} \cdot G_{21}} \qquad (4)$$

The frame is however only likely to be received at station R2 provided $$P_2 \geq \frac{\gamma_{min} \cdot P_1 \cdot G_{12}}{G_{22}} \qquad (5)$$

It is important to note that both station T2 and station R2 must ensure that neither of them is interfering with any of station T1 or station R1. A failure of response from station R2 may be due to interference from either station T1 or station R1. In such case the transmission is deferred until the channel becomes free according to traditional rules defined in the IEEE 802.11-1999 standard.

As IEEE 802.11 utilizes a shared channel between RTS, CTS and DATA, this means that RTS, CTS messages preferably are TP controlled. As a consequence of this, there is no guarantee that $P_{TX}(RTS)$, $P_{TX}(CTS)$, $P_{RX\_max}$ and Duration can be detected.

In a non-IEEE 802.11 system with a channel where RTS, CTS messages does not directly impact DATA reception success, then $P_{TX}(RTS)$, $P_{TX}(CTS)$, $P_{RX\_max}$ and Duration information can be distributed more widely thanks to that RTS, CTS messages can use a less aggressive TPC.

In case it is determined that e.g., an RTS frame requiring $P_{TX}(RTS)$ can be sent without disturbing ongoing communication with good margin, employed LA(RTS) may be increased in the extent that $P_{TX}(RTS)$ can be allowed to increase.

Figure 14:
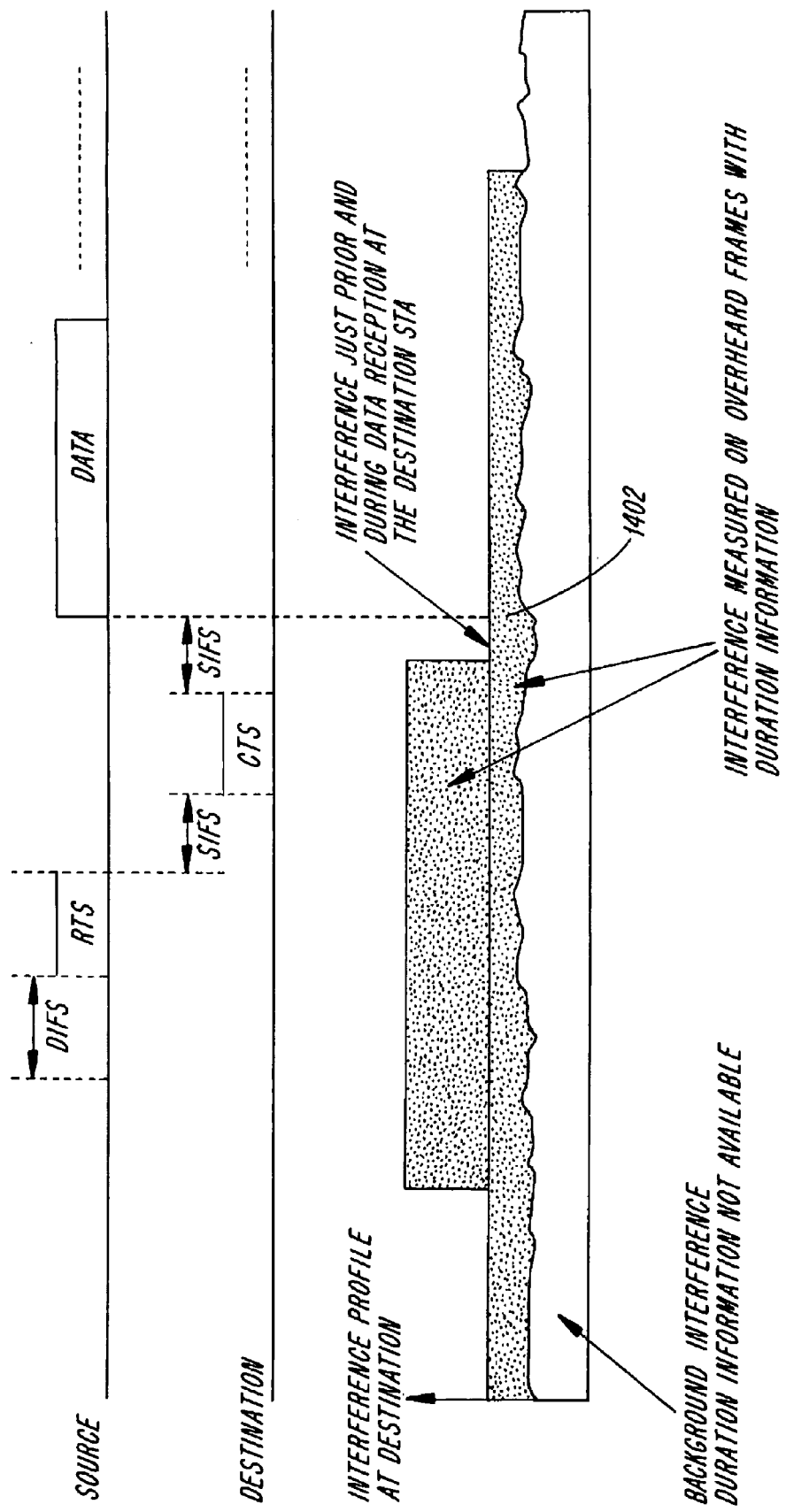
FIG. 14 shows an interference profile at a receiving station in accordance with exemplary embodiments of the invention.

A procedure is now provided for determining $I_{RX}$. This procedure can be used, for example, in the Tier 3 Closed Loop DATA TPC, DATA LA and Joint TPC and LA for DATA scheme described further above. The determined value of $I_{RX}$ can also be used when determined $P_{RX\_min}$ that can be subsequently transmitted in at least one of the following: a) tier 1 frames; b) tier 2 frames; or c) tier 3 frames. In receiving an RTS message, the receiving station R determines preferably the instantaneous carrier to Interference ratio CIR. As one preferred option, the interference is not just determined based on measured RSSI (Received Signal Strength Indicator), but is also determined based on DURATION information that has been derived from overheard traffic between other STAs. In this manner, the expected $I_{RX}$ at the start of the DATA reception can be determined. FIG. 14 shows an interference profile at a receiving station R, and timing of the RTS and DATA signals from a Source, relative to the CTS signal from the destination (the receiving station R). As shown in FIG. 14, a period DIFS occurs before the RTS signal is sent, and a SIFS separates the RTS from the CTS in time, and a SIFS also separates the CTS from the DATA in time. The interference profile at the destination indicates that interference is measured on overheard frames with duration information. In this example, the interference increases before the DIFS period begins, and then decreases to a lower level after the CTS, before the DATA transmission. Note that $I_{RX}$ may additionally also be filtered to better reflect a long time average interference level.

In accordance with exemplary embodiments of the invention, a procedure is also provided to determine minimum required receive power. The minimum required receive power, $P_{RX\_min}$, is used for group TPC of RTS and CTS frames such that they can reach every intended station, even stations that experience different interference or have different noise floors. This information is normally distributed in IE elements, for example those defined in FIGS. 12 and 19-23. However, when frames (e.g. CTS) also include $P_{RX\_max}$ as discussed in further above, that information will provide additional input to determine $P_{RX\_min}$ through the relation $$P_{RX_{min}} = \frac{P_{RX_{min}}}{\text{Constant}} \quad (6)$$

where the constant typically is the required carrier to interference ratio $\gamma_{min}$. The reciprocal procedure may also be used, i.e., given $P_{RX\_min}$ in a frame, $P_{RX\_max}$ can be determined.

With respect to multihop networking, a multihop network employing a RTS, CTS based channel access scheme can utilize the proposed methods and achieve additional benefits over the already discussed. In some envisioned multihop networks, the path gain is used as the cost in calculating the shortest path to the destination. With this metric, the shortest path is the path with the minimum required TP as well as generating minimum interference. In determining the shortest path cost, the path gain to neighboring STAs need to be acquired. If all frames, including RTS, CTS but also e.g., BEACONS the latter being sent at high TP, carry such TP information, then the load and intensity of messages probing path gains to neighbors can potentially be reduced. Another issue is that more precise link gain knowledge is useful is in so called topology control. Topology control is a well-known technique for maintaining sufficient and sensible connectivity in a multihop network when TPC is employed.

With respect to Asymmetrical link capabilities, due to the closed loop approach for DATA and ACK TPC, exemplary embodiments of the invention support the case having asymmetrical link(s). This may be due to a number of reasons, including for example the following reasons. Communication in each direction takes place over a non-reciprocal but short term stationary channel, e.g. FDD (Frequency Division Duplex). Stations have different TP and LA capabilities. The interference situation is different at the two communicating STAs. The symmetrical cases are automatically handled, as they are degenerated cases of the more asymmetric cases.

Asymmetries in noise and interference are also supported for the RTS, CTS TPC since $P_{RX\_min}$ can be included.

With respect to Frame Structure, a number of different embodiments are available for the frames depending to which extent mechanisms as defined in this disclosure are exploited. Sizes of proposed frame elements are only exemplary and may differ in reality. Exemplary frame structures as defined in the IEEE 802.11-1999 standard are used, but other frame formats with similar function are conceivable. For example TPC and LA information may not just be signaled in OSI Layer 2 (MAC) frames, but also in e.g., OSI Layer 1 (PHY) or OSI Layer 3 (Network) frames.

Figure 15:
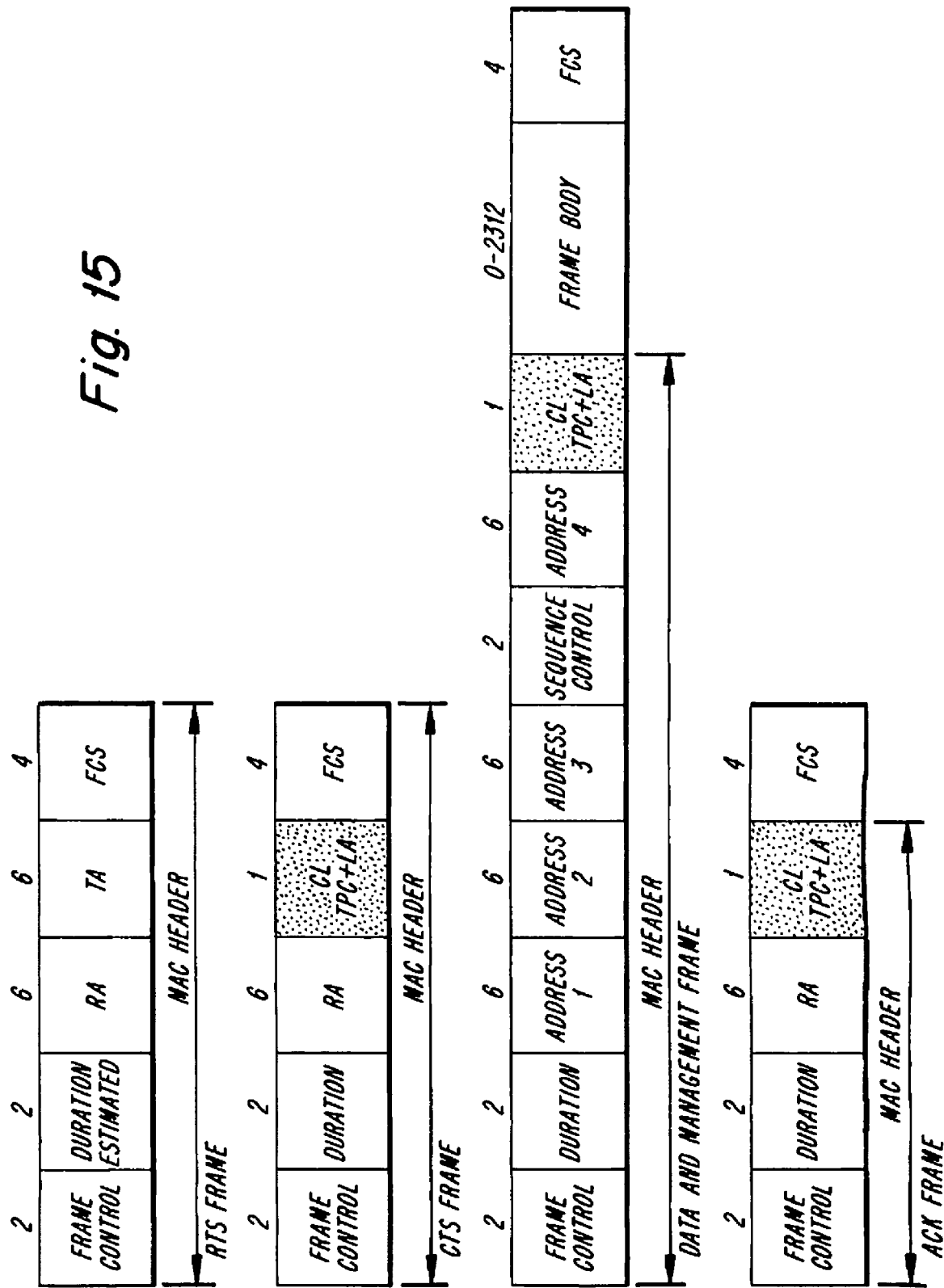
FIG. 15 shows exemplary frame formats including Closed Loop TPC and LA in accordance with exemplary embodiments of the invention.

In a first scenario, the frame format is as depicted in FIG. 15. This scenario addresses the closed loop TPC and LA for, DATA, an optional successive ACK and optional support of multiple fragments of DATA. In the RTS frame shown in FIG. 15, the fields are the same as those defined in the IEEE 802.11-1999 standard. In each of the CTS, DATA and MANAGEMENT, and ACK frames, a new field of one octet or byte is provided, for example between the RA and FCS (Frame Check Sequence) fields in the CTS frame. This new field is mandatory in the CTS frame, but is optional in the other frames. The new field can include a) Closed Loop (CL) TPC, or b) CL LA, or c) CL joint TPC and LA. For example, the field can include a $P_{TX}$ Request. FIG. 24 shows an exemplary format of the $P_{TX}$ Request, including a reserved section of bits B0-B1 and a data section of bits B2-B7 including CL-TPC info in 1 dB steps. In the DATA and MANAGEMENT frame shown in FIG. 15, the new field is used if the ACK frame(s) is(are) adjusted. In the ACK frame, the new field is used if the successive DATA frame(s) is(are) adjusted.

Figure 16:
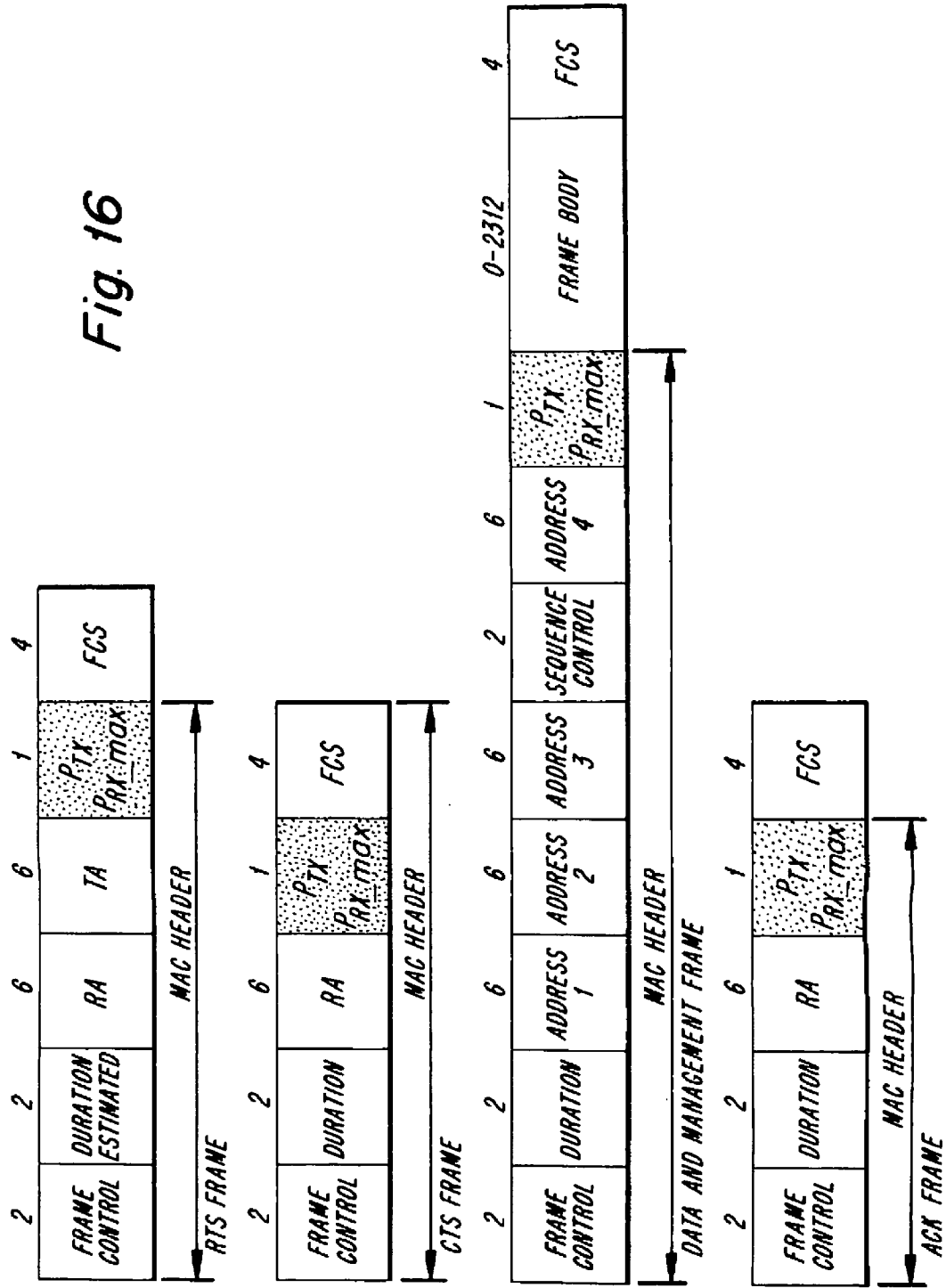
FIG. 16 shows exemplary frame formats including TP Information fields in accordance with exemplary embodiments of the invention.

In a second scenario addressing the open loop TPC for interference mitigation, the frame format is as depicted in FIG. 16. In each of the RTS, CTS, DATA and MANAGEMENT, and ACK frames, a new field of one octet or byte is provided between the Transmit Address (TA) and FCS fields, and the Receive Address (RA) and FCS fields respectively. The new field (relative the IEEE 802.11-1999 standard) is a $P_{TX}$-$P_{RXmax}$ field that includes only $P_{TX}$, or $P_{TX}$ and $P_{RX\_max}$ combined. This new field may be mandatory in the RTS and CTS frames, but is optional in the DATA and MANAGEMENT frame and the ACK frame. In the DATA and MANAGEMENT frame and the ACK frame, the new field is used at least if successive DATA fragments will be sent.

Figure 17:
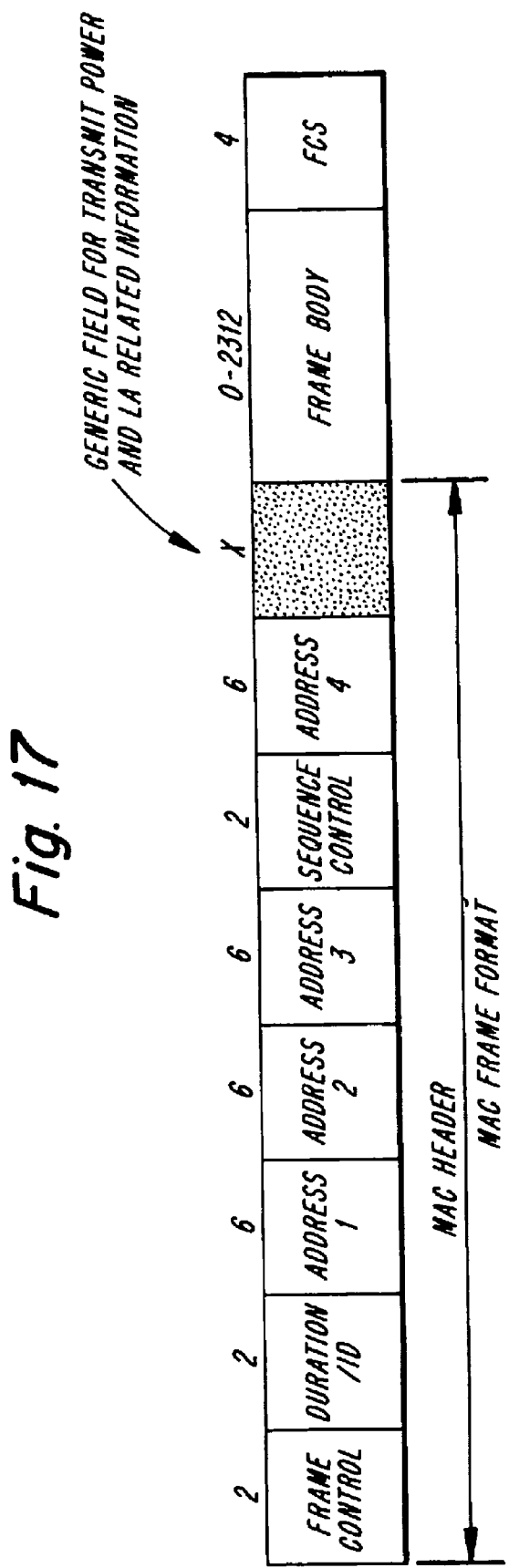
FIG. 17 shows a frame format including a generic field for TP and LA information in accordance with exemplary embodiments of the invention.

The generic frame format defined in the IEEE 802.11-1999 standard is depicted in FIG. 17. A generic field of length X for any type of combination of TPC, LA, TP information and receive power threshold is included therein.

In summary, exemplary embodiments of the present invention convey numerous advantages. For example, the proposed mechanisms, protocols and frame structures allow advanced and precise RRM (Radio Resource Management) management through TPC and LA under topologies like IBSS, BSS and entirely distributed networks. In addition, both the TPC and the LA mechanism are to large extent instantaneous thanks to conveying TPC and LA information in RTS and CTS frames, (and optionally in DATA and ACK frames). As the bulk interference comes (or should come) from data transmission, a very tight instantaneous TPC and LA reduces the generated interference to a bare minimum. In addition, as the bulk energy consumption comes (or should come) from data transmission, a very tight instantaneous TPC and LA reduces the power consumption to a bare minimum. The invention supports asymmetrical links. The invention supports group based TPC for RTS and CTS frames and hence reduces the generated interference as well as power consumption related to those messages to a bare minimum. The invention reuse the Beacon and Target Beacon Transmission Time, TBTT for measuring path gains, thereby complying well with power saving objectives as well as being power consumption efficient. An increased spatial reuse is attained through conditioning the channel access to being allowed as long as ongoing communication is not disturbed noticeable. A tiered TPC approach with few occasional high TP transmissions guiding many regular low power TP transmissions reduces the generated interference, reduces the power consumption and to a bare minimum whereas system capacity is potentially enhanced. Multihop based networks can take additional advantage of the distributed TP information in e.g. RTS, CTS frames and thereby reducing the load an intensity of probing frames to neighbors used for determining average path gain to neighbors that may be used in shortest path metric or for topology control.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed:

1. A method for open loop group transmit power control in a wireless system, comprising the steps of:
   transmitting a frame conveying transmit power information for the frame to any proximate station;
   a proximate station receiving the frame and determining a path gain based on measured signal strength of the frame and on the transmit power information conveyed in the received frame;
   selecting path gains originating from a group of stations;
   determining a transmit power required to reach any of the selected path gains;
   selecting a minimum of a highest transmit power and allowed transmit power, wherein the allowed transmit power is determined by regulatory requirements and station transmit power capabilities; and
   assigning the selected transmit power to Clear To Send (CTS) messages.

2. The method of claim 1, wherein the wireless system comprises an infrastructure-less system or Independent Basic Service Set (IBSS) and the frame is a 802.11 BEACON frame.

3. The method of claim 1, wherein the frame comprises an indication of a minimum required receive power.

4. The method of claim 3, wherein the minimum required receive power is set relative to an indicated transmit power level.

5. The method of claim 3, wherein the required transmit power is determined based on the minimum required receive power.

6. The method of claim 1, wherein the RTS transmit power setting is determined based on input parameters related only to the destination station.

7. The method of claim 1, comprising assigning the selected transmit power to Request to Send (RTS) messages.

8. A method for open loop group transmit power control in a wireless system, comprising the steps of selecting, by a first station, at least one station within a group;
   transmitting a transmit power information request from the first station to the at least one selected station;
   transmitting a transmit power response in a frame, the frame comprising transmit power information for the frame, to any proximate station from the at least one selected stations in orderly manner preventing collisions;
   receiving the frame and determining a path gain based on measured signal strength of the received frame and the transmit power information in the received frame;
   selecting path gains originating from the group;
   determining required transmit power to reach any of the selected path gains;
   selecting a minimum of a highest transmit power and allowed transmit power, wherein the allowed transmit power is determined by regulatory requirements and stations transmit power capabilities; and
   assigning the selected transmit power to Clear To Send (CTS) messages.

9. The method of claim 8, wherein the wireless system is an infrastructure system or a Basic Service Set (BSS) and wherein the transmit power request is conveyed as an information element in an IEEE 802.11 management frame.

10. The method of claim 9, wherein the management frame is a beacon, probe request or generic management frame.

11. The method of claim 10, wherein the RTS transmit power setting is determined based on input parameters related only to the destination station.

12. The method of claim 8, wherein the transmit power response is conveyed as an information element in an IEEE 802.11 management frame.

13. The method of claim 12, wherein the management frame is a probe request, probe response or generic management frame.

14. The method of claim 8, comprising assigning the selected transmit power to Request To Send (RTS) messages.

15. A method for interference mitigation based on open loop transmit power control enabling tighter medium reuse, comprising the steps of:
   conveying transmit power control information in every transmitted frame;
   receiving transmitted frames and determining a path gain based on measured signal strength of the received frames and said transmit power control information conveyed in the received frames;
   determining a maximum instantaneously allowed transmit power based on all overheard frames; and performing at least one of a) reducing transmit power, and b) reducing transmit power in combination with adjusting link rate to ensure that the maximum instantaneously allowed transmit power is not exceeded during any transmission attempt.

16. The method in claim 15, wherein Request To Send (RTS) and Clear To Send (CTS) frames convey transmit power information.

17. The method of claim 15, comprising:
determining a maximum allowed receive power; and
determining the maximum allowed transmit power based on the determined maximum allowed receive power.

18. The method of claim 15, wherein a station defers access and enters a back off mode when the maximum instantaneous allowed transmit power has to be exceeded.

* * * * *

UNITED STATES PATENT AND TRADEMARK OFFICE
CERTIFICATE OF CORRECTION

PATENT NO. : 7,885,680 B2
APPLICATION NO. : 11/947306
DATED : February 8, 2011
INVENTOR(S) : Larsson It is certified that error appears in the above-identified patent and that said Letters Patent is hereby corrected as shown below:

On Page 2, in Field (56), under "OTHER PUBLICATIONS", in Column 2, Line 2, delete "ARRl/CRRL" and insert -- ARRL/CRRL --, therefor.

In Column 3, Line 55, delete "Control"." and insert -- Control", --, therefor.

In Column 4, Line 65, delete "invention" and insert -- invention, --, therefor.

In Column 12, Line 41, delete "$P_{RX}$-min" and insert -- $P_{RX\_min}$ --, therefor.

In Column 14, Line 21, delete "GENERIC_MANAGEMENT FRAME" and insert -- GENERIC_MANAGEMENT_FRAME --, therefor.

In Column 15, Line 20, delete "lEs," and insert -- IEs, --, therefor.

In Column 15, Line 57, delete "(STAS)" and insert -- (STAs) --, therefor.

In Column 16, Line 2, delete "$P_{RX\_MAX}$" and insert -- $P_{RX\_max}$ --, therefor.

In Column 16, Line 5, delete "$P_{RX\_MAX}$" and insert -- $P_{RX\_max}$ --, therefor.

In Column 18, Line 28, delete "example" and insert -- example, --, therefor.

In Column 18, Line 58, delete "$P_{TX}$-$P_{RXmax}$" and insert -- $P_{TX}$-$P_{RX\_max}$ --, therefor.

In Column 19, Line 65, in Claim 1, delete "and" and insert -- and, --, therefor.

In Column 20, Line 19, in Claim 8, delete "of" and insert -- of: --, therefor.

In Column 20, Line 37, in Claim 8, delete "and" and insert -- and, --, therefor.

Signed and Sealed this
Twenty-fourth Day of May, 2011

David J. Kappos
*Director of the United States Patent and Trademark Office*

CERTIFICATE OF CORRECTION (continued)
U.S. Pat. No. 7,885,680 B2

In Column 20, Line 67, in Claim 15, delete "and" and insert -- and, --, therefor.

In Column 21, Line 7, in Claim 16, delete "in" and insert -- of --, therefor.